(12) United States Patent
Matsui et al.

(10) Patent No.: US 7,898,745 B2
(45) Date of Patent: Mar. 1, 2011

(54) LENS UNIT AND IMAGE PICKUP APPARATUS

(75) Inventors: Kazuaki Matsui, Yodogawa-ku (JP);
Tetsuya Uno, Tondabayashi (JP);
Yoshifumi Mitani, Sakai (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 119 days.

(21) Appl. No.: 12/280,410

(22) PCT Filed: Feb. 20, 2007

(86) PCT No.: PCT/JP2007/053042
§ 371 (c)(1),
(2), (4) Date: Oct. 27, 2008

(87) PCT Pub. No.: WO2007/099813
PCT Pub. Date: Sep. 7, 2007

(65) Prior Publication Data
US 2010/0027133 A1    Feb. 4, 2010

(30) Foreign Application Priority Data

Feb. 27, 2006  (JP) ................................ 2006-049922
Jun. 26, 2006  (JP) ................................ 2006-174927

(51) Int. Cl.
*G02B 15/14*  (2006.01)
*G02B 7/00*   (2006.01)
*G03B 5/02*   (2006.01)

(52) U.S. Cl. ......... 359/694; 359/678; 359/697; 359/699; 359/823; 396/349

(58) Field of Classification Search .................. 359/676, 359/678, 683, 694, 706; 396/348–349
See application file for complete search history.

(56) References Cited

U.S. PATENT DOCUMENTS

| 5,329,329 | A  | * | 7/1994 | Fukushima et al. | ........... 359/691 |
| 6,115,197 | A  |   | 9/2000 | Funahashi | ...................... 359/826 |
| 6,850,373 | B2 |   | 2/2005 | Mihara et al. | ................. 359/676 |
| 7,369,333 | B2 |   | 5/2008 | Chigasaki et al. | ............ 359/819 |
| 7,418,200 | B2 | * | 8/2008 | Imai et al. | ........................ 396/87 |
| 2005/0104996 | A1 |   | 5/2005 | Makii | ............................ 348/360 |

(Continued)

FOREIGN PATENT DOCUMENTS
JP    11-119078 A    4/1999

(Continued)

*Primary Examiner* — Jordan M. Schwartz
(74) *Attorney, Agent, or Firm* — Sidley Austin LLP

(57) ABSTRACT

A simply structured zooming movement mechanism for moving a first lens group located in the object side from a bending member. Also provided are a small-sized lens unit by making it collapsible and an image pickup apparatus. The lens unit has: the bending member for bending the light, entering from an object along a first optical axis, to the direction of a second optical axis substantially perpendicular to the first optical axis; and a first moving member for moving a first support member, which supports the first lens group, in the direction of the first optical axis to a storage position; a bending member moving member for moving the bending member to an evacuation position in order to create a space for storing the first supporting member; and a first zooming movement member for moving the first supporting member in the direction of the first optical axis in a variable magnification manner. The first zooming movement member, the bending member moving member and the first moving member are driven in this order.

20 Claims, 15 Drawing Sheets

U.S. PATENT DOCUMENTS

| | | | |
|---|---|---|---|
| 2006/0098306 A1 | 5/2006 | Yoshitsugu et al. | 359/819 |
| 2007/0183065 A1* | 8/2007 | Chigasaki et al. | 359/819 |

FOREIGN PATENT DOCUMENTS

| | | |
|---|---|---|
| JP | 2000-131610 A | 5/2000 |
| JP | 2003-169236 A | 6/2003 |
| JP | 2004-69808 A | 3/2004 |
| JP | 2004-102089 A | 4/2004 |
| JP | 2005-37548 A | 2/2005 |
| JP | 2005-134783 A | 5/2005 |
| JP | 2005-300562 A | 10/2005 |
| JP | 2006-259685 A | 9/2006 |
| WO | WO 2007/099813 A1 | 9/2007 |

* cited by examiner

LENS UNIT AND IMAGE PICKUP APPARATUS

RELATED APPLICATIONS

This application is a National Stage of International Application No. PCT/JP2007/053042, filed Feb. 20, 2007, which is based on Japanese Patent Application No. 2006-049922 and Japanese Patent Application No. 2006-174927, the entire contents of which is incorporated herein by reference.

TECHNICAL FIELD

The present invention relates to a lens unit and an image pickup apparatus, particularly relates to a lens unit provided with a zoom mechanism and a collapsing mechanism for a bending optical system.

BACKGROUND ART

In recent years, digital cameras, which can easily capture an image into a personal computer, have become popularized with the spread of personal computers. It has also become common to incorporate a digital camera into information management systems, such as mobile computers, cellular phones and personal digital assistants (PDA: Personal Digital Assistant). With the spread of such digital cameras, a smaller digital camera has become to be demanded, and it becomes necessary to make a lens unit still smaller. The zoom lens of a large zoom ratio is required, and a zoom mechanism, which can realize such a zoom lens of a large zoom ratio, is demanded.

In order to make a lens unit small, proposals have been made in which the whole length of an image pickup lens does not change when zooming, and the camera size is minimized with a short depth of a digital camera. (Patent documents Nos. 1 and 2) These disclose a bending member on an optical path, and after folding an optical path substantially by 90 degrees, a following lens group forms an optical image on an image sensor.

In the two references mentioned above, the lens units surely become small. However, since the lens in the image sensor side of the bending member is moved to perform a zooming operation, the zoom ratio of the image pickup lens is small.

In order to solve this problem, the zoom lenses of a large zoom ratio have been proposed in which the lens in the object side of the bending member is moved to perform a zooming operation together with the lens in the image sensor side of the bending member. (Patent document 3)

Patent document No. 1: Unexamined Japanese Patent Application Publication No. 2000-131610
Patent document No. 2: Unexamined Japanese Patent Application Publication No. 2004-69808
Patent document No. 3: Unexamined Japanese Patent Application Publication No. 2004-102089

DISCLOSURE OF INVENTION

Object of Invention

In the zoom lens disclosed in Patent document No. 3, although a highly effective optical system with high variable magnification in which an aberration is well corrected is disclosed, the mechanism for moving the lens arranged front and back of the bending member for variable magnification is not disclosed, and the lens in the side of a photographic object projects from a digital camera and a camera become a large-sized. In order to realize a thin shaped camera, an interval between the bending member and the lens in the side of a photographic object from the bending member must be short. However, as a result, interference caused by the bending member and the lens and interference caused by the bending member and the lens moving mechanism arise at the time when collapsing the lens.

An object of the present invention is to provide a moving mechanism for zooming in a bending optical zoom lens which suppresses the length of projection of the lens, which is in the object side of the bending member, from a digital camera, the structure of the moving mechanisms for zooming is simple, and a lens unit which can be made small by collapsing the lens in the object side into the digital camera, without making interfere with a bending member when not in use.

Means to Solve the Object

The above-mentioned problems will be solved by the next configuration.

Item 1. A lens unit for focusing light from an object on an image sensor, the lens unit comprising:
a first lens group which is provided in a direction of a first optical axis, receives the light from the object, and moves in the direction of the first optical axis in conjunction with a zooming operation;
a first support member which supports the first lens group to be movable in the direction of the first optical axis;
a first zooming movement member which moves the first support member in the direction of the first optical axis in conjunction with the zooming operation;
a first moving member which moves the first support member to a usage position in which the first support member is projected from a chassis, and to a storage position in which the support member is stored in the chassis;
a bending member which bends the first optical axis in a direction of a second optical axis which is substantially perpendicular to the direction of the first optical axis;
a bending member supporting member which supports the bending member to be movable between a bending position in which the bending member bends the first optical axis in the direction of the second optical axis and an evacuation position in which a storage space for storing the support member is provided; and
a bending member moving member which moves the bending member supporting member to the bending position and the evacuation position,
wherein when collapsing, after a space is created, through which space the bending member supporting member can be moved, the bending member moving member moves the bending member supporting member, and then the first moving member moves the first support member.

Item 2. A lens unit for focusing light from an object on an image sensor, the lens unit comprising:
a first lens group which is provided in a direction of a first optical axis, receives the light from the object, and moves in the direction of the first optical axis in conjunction with a zooming operation;
a first support member which supports the first lens group to be movable in the direction of the first optical axis;
a first zooming movement member which moves the first support member in the direction of the first optical axis in conjunction with the zooming operation;
a first moving member which moves the first support member to a usage position in which the first support member is projected from a chassis, and to a storage position in which the support member is stored in the chassis;

a bending member which bends the first optical axis in a direction of a second optical axis which is substantially perpendicular to the direction of the first optical axis;

a bending member supporting member which supports the bending member to be movable between a bending position in which the bending member bends the first optical axis in the direction of the second optical axis and an evacuation position in which a storage space for storing the support member is provided; and a bending member moving member which moves the bending member supporting member to the bending position and the evacuation position, wherein when collapsing, the first support member is halted for a predetermined period of time, the bending member moving member moves the bending member supporting member, and then the first moving member moves the first support member.

Item 3. The lens unit of item 1 or 2, wherein when the bending member moving member moves the bending member supporting member, the first support member is located at a position (which is between a wide angle end and a telephoto end for the first support member) in which the first support member is projected from the chassis and image pickup is possible.

Item 4. The lens unit of item 1, wherein the first moving member includes:

a fixed cylinder which is fixed on the chassis; and a rotary cylinder which is rotatably mounted on the fixed cylinder, wherein the space is defined by an overlapping portion of a notch portion formed in the fixed cylinder and a notch portion formed in the rotary cylinder, and the vending member supporting member moves to the evacuation position passing through the overlapping portion.

Item 5. The lens unit of item 2, wherein the first moving member includes:

a fixed cylinder which is fixed on the chassis; and a rotary cylinder which is rotatably mounted on the fixed cylinder, wherein when the first support member is halted, the rotary cylinder is rotating.

Item 6. The lens unit of item 4 or 5, wherein the first zooming movement member is configured of:

a linearly-moving cylinder which linearly moves together with the rotary cylinder; and a zooming movable cylinder which is mounted, movably in the direction of the first optical axis, on the linearly-moving cylinder, wherein when the rotary cylinder rotates, the zooming movable cylinder moves the first support member in conjunction with the zooming operation in a first rotation region, the rotary cylinder moves the first support member from the usage position to the storage position in a second rotation region, and the bending member moving member moves the bending member support member to the evacuation position in a third rotation region which is between the first rotation region and the second rotation region.

Item 7. The lens unit of item 6, wherein the bending member moving member includes:

a rotary shaft which is parallel to the first optical axis, wherein in the third rotation region, the bending member moving member rotatingly moves the bending member supporting member about the rotary shaft from the bending position to the evacuation position.

Item 8. The lens unit of item 6, wherein the notch portion formed in the fixed cylinder and the notch portion formed in the rotary cylinder overlap each other in the third rotation region.

Item 9. The lens unit of item 6, wherein the first support member is halted for a predetermined period of time in the third rotation region.

Item 10. The lens unit of item 9, wherein the first zooming movement member includes:

a cam groove which corresponds to the first rotation region through the third rotation region, wherein a portion, of the cam groove, corresponding to the third rotation region is perpendicular to the optical axis.

Item 11. The lens unit of item 1 or 2, comprising:

an actuator which moves the first moving member; and a mechanism which causes the bending member moving member to move the bending member supporting member in conjunction with a movement of the first moving member caused by the actuator.

Item 12. The lens unit of item 1, comprising:

a detection section which detects a position of the first support member, wherein the first support member is configured of a frame member which can move in the direction of the first optical axis without rotation, the first zooming movement member is configured to have an angled U-shaped arm which linearly moves the first support member in the direction of the optical axis, and the space is created by moving the first support member and the first zooming movement member to a predetermined position after deciding a moving direction of the first support member based on a detection result of the detection section.

Item 13. The lens unit of item 2, wherein the first support member is configured of a frame member which can move in the direction of the first optical axis without rotation, the first zooming movement member is configured to have an angled U-shaped arm which linearly moves the first support member, and the bending member moving member moves the bending member supporting member from the bending position to the evacuation position while the first support member is halted.

Item 14. The lens unit of item 1 or 2, comprising:

two driving sources, wherein one of the driving sources drives the first zooming movement member, and the other of the driving sources drives the first moving member.

Item 15. An image pickup apparatus, comprising:

the lens unit of any one of items 1 through 14; and an image sensor which receives light guided by the lens unit.

Effects on the Invention

According to one aspect of the present invention, although the distance between a bending member and the lens in the object side is made small, it is possible to collapse the lens in the object side into inside of a digital camera, when not in use, preventing the lens and the bending member from interfering each other. The moving mechanism for zooming, which decreases the length projecting from a digital camera, can be realized. As a result, a small sized, especially a thin lens unit and an image pickup apparatus can be realized.

DESCRIPTION OF THE NUMERALS

10 CAMERA CHASSIS
12 LENS UNIT
15 DISPLAY SECTION
19 RELEASE BUTTON
20 POWER BUTTON
25 IMAGE PICKUP LENS ACTUATOR
26 IMAGE SENSOR
27 CONTROL SECTION
28 POSITION SENSOR
31 FIXED CYLINDER
31a INTERNAL HELICOID (FIRST MOVING MEMBER)
31b STRAIGHT GROOVE
31c APERTURE
31d CIRCUMFERENCE GROOVE
31e LEAD-IN GROOVE
32 ROTARY CYLINDER
32a EXTERNAL HELICOID (FIRST MOVING MEMBER)
32b STRAIGHT GROOVE
32C CIRCUMFERENCE GEAR
32d BAYONET SECTION
32e LOZENGE FOLLOWER
32f VARIABLE MAGNIFICATION LINKAGE PROJECTION
32g COLLAPSING INTERLOCK SECTION
32h APERTURE
33 LINEARLY-MOVING CYLINDER (FIRST ZOOMING MOVEMENT MEMBER)
33a STRAIGHT RIB
33b STRAIGHT GROOVE
33d BAYONET CLAW SECTION
33e CIRCUMFERENCE HOLE
33f LEAD HOLE
34 VARIABLE MAGNIFICATION ROTARY CYLINDER (FIRST ZOOMING MOVEMENT MEMBER)
34a CAM FOLLOWER
34d BAYONET SECTION
34e CIRCUMFERENCE GROOVE
34f CAM GROOVE
35 VARIABLE MAGNIFICATION LINEARLY-MOVING CYLINDER (FIRST ZOOMING MOVEMENT MEMBER)
35a STRAIGHT RIB
35b STRAIGHT HOLE
35d BAYONET CLAW SECTION
36 FIRST MOTOR
37 REDUCTION GEAR ARRAY
38 LONG GEAR
39 INTERLOCKING GEAR (BENDING MEMBER MOVING MEMBER)
39a COLLAPSING LINKAGE PROJECTION
51 SECOND GUIDE SHAFT
61 THIRD GUIDE SHAFT
62 THIRD DRIVING SHAFT
63 THIRD MOTOR
70 CHASSIS
70a GUIDE GROOVE
70b SHAFT HOLDING SECTION
70C REGULATION SECTION
71 FIRST SUPPORT MEMBER
71a CAM FOLLOWER
72 SECOND SUPPORT MEMBER
72a SLIDING GLIDE HOLE
72b SECOND SPRING
72C VARIABLE MAGNIFICATION CONTACT SECTION
72d COLLAPSING CONTACT SECTION
72f GUIDE PIN
72t HAND SHAKE CORRECTING UNIT
73 THIRD SUPPORT MEMBER
73a THIRD SLIDING HOLE
73b THIRD ENGAGING SCREW
73c ROTATION STOP SECTION
75 PRISM SUPPORT MEMBER, MIRROR SUPPORT MEMBER (BENDING MEMBER SUPPORTING MEMBER)
75a ARM
75b PRISM GEAR (BENDING MEMBER MOVING MEMBER)

75c PRISM SPRING
75d COLLAPSING CONTACT PROJECTION
76 FIRST OPTICAL AXIS
77 SECOND OPTICAL AXIS
78 AXIS
81 FIRST LENS GROUP
82 SECOND LENS GROUP
82t HAND SHAKE CORRECTING LENS
83 THIRD LENS GROUP
85 PRISM, MIRROR (BENDING MEMBER)
91 INTERLOCKING SHAFT
91a VARIABLE MAGNIFICATION INTERLOCKING SECTION
91b VARIABLE MAGNIFICATION CONTACTING PROJECTION SECTION
91c STOPPER
91d LINEARLY-MOVING PROJECTION
91e INTERLOCKING SPRING
95 ELECTRO-MAGNET SOLENOID
96 DRIVING PLATE
99 SHUTTER UNIT
100 DRIVE PIECE (FIRST MOVING MEMBER, FIRST ZOOMING MOVEMENT MEMBER)
100a, 100b and 100c DRIVING PIECE PIN
101 FOLLOWING PIECE
101a and 101b FOLLOWING PIECE PIN
103 DRIVEN PIECE SHAFT
104 FIRST MOTOR
105 LINEARLY-MOVING CYLINDER
105a BOTTOM SECTION
105b CONTACT SECTION
106 CAM PLATE
106a DISPLACEMENT CONTACT SECTION
107 REDUCTION GEAR ARRAY
108 SECTOR GEAR SECTION
109 CAM PLATE GROOVE
110 LINEARLY-MOVING CYLINDER COMPRESSION SPRING
120 FIRST GUIDE SHAFT
130 CAM PLATE SHAFT
150 SECOND MOTOR
151 SECOND GUIDE SHAFT
160 DRIVING SHAFT
161 ENGAGING SCREW
200a SLIDING GUIDE HOLE
200b SLIDING GUIDE SECTION
711, 712, 713 and 714 GUIDE GROOVE

BEST MODE FOR CARRYING OUT THE INVENTION

Figure 1:
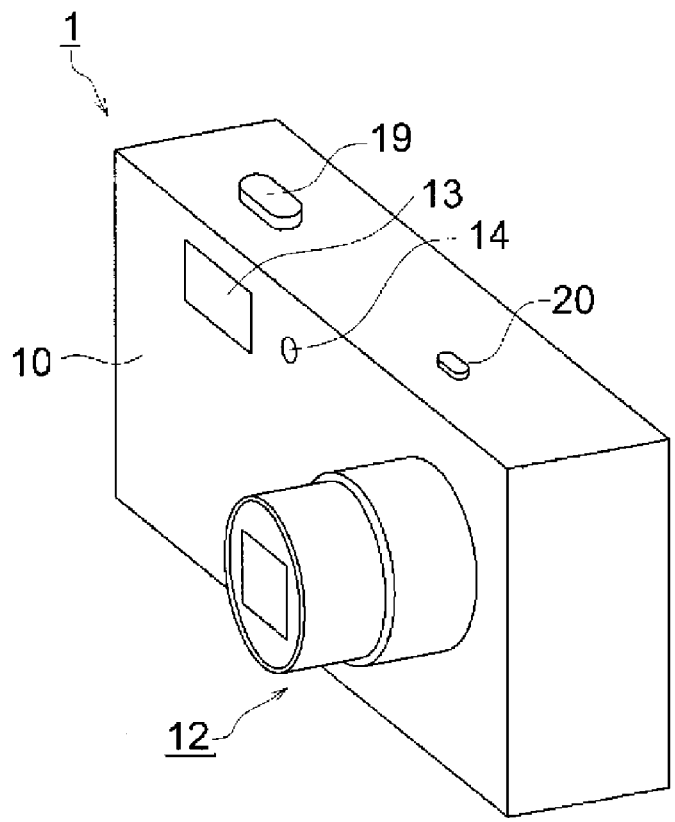
FIG. 1(a) is a perspective view schematically illustrating the appearance of a digital camera of the present invention and FIG. 1(b) illustrates a rear elevation of the digital camera.
Figure 1:
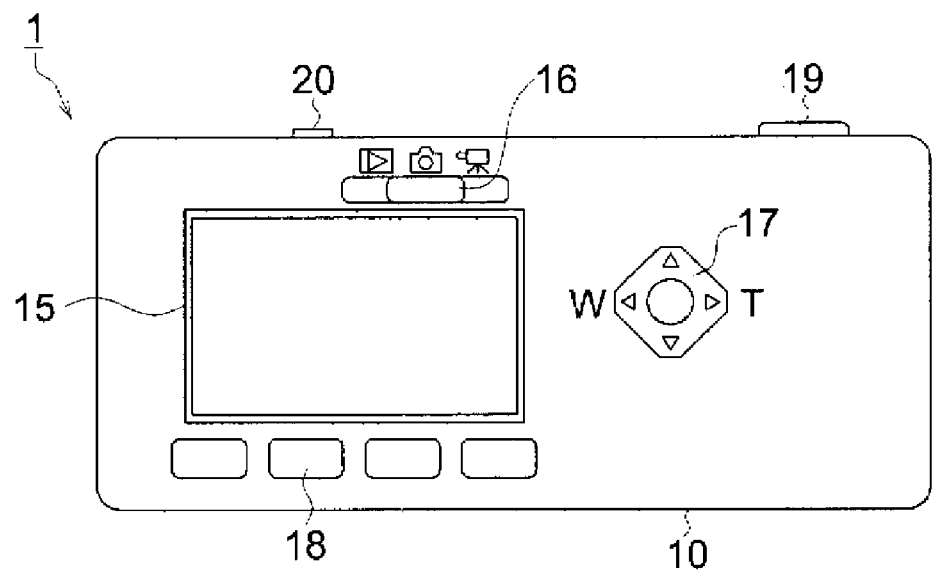

Hereafter, an embodiment of the present invention will be described by referring to drawings. The appearance of a digital camera 1 is schematically illustrated in FIG. 1. FIG. 1(a) is a perspective view, and FIG. 1(b) is a rear elevation.

The digital camera 1 is provided with a lens unit 12, which is arranged to be projected from a camera chassis 10 at the time when photographing and a substantially rectangular parallelepiped camera chassis 10. The projection direction of the lens unit 12 is defined as the depth direction, the longitudinal direction of the camera chassis 10 is defined as a lateral direction, and the up-and-down direction of FIGS. 1(a) and 1(b) is defined as a vertical direction.

The digital camera 1 is equipped with the lens unit 12, a flash light emitting section 13 and a self-timer lamp 14 in the front surface, a display section 15, a mode setting switch 16, a cross key 17 and a plurality of operation keys 18 on the back surface, and a release button 19 and a power button 20 on the upper surface.

The lens unit 12 is a zoom lens, and when it is in a usage position, a part of the lens projects from the front surface of the camera chassis 10, and it projects further when it performs variable magnification to a telephoto end from a wide angle end. The optical axis is bent by a bending member, which will be described later in a substantially right angle and the remaining lens portion is arranged inside the camera chassis 10 in the lateral direction. A part of the lens which is projected when in use is collapsed and stored in a storage position inside the camera chassis when it is not in use and carried without taking pictures.

The flash light emitting section 13 emits flash light which illuminates a photographic object. The self-timer lamp 14 indicates, by lighting, that preparation of a self-timer image pickup is advancing.

The display section 15 on the back surface comprises a liquid crystal display, and displays information including the setting status of the digital camera 1, an operation guidance, etc., besides photographed image. The mode setting switch 16 is of slide type and is used for setting up operational modes, of the digital camera 1, such as an image pickup mode or a reproduction mode. The cross key 17 has four contact points vertically and horizontally, and is used for moving the cursor displayed on the display section 15. The cross key 17 is also used for adjusting the focal length of the lens unit 12. The operation key 18 is used for a setup with respect to functions of the digital camera 1 such as a change of the item displayed on display section 15 and selection of the displayed item. A release button 19 operates in two steps and is used for a direction a preparation for photographing an image to be recorded in the state of half press of the release button 19, and a direction of photographing the image to be recorded in the state of full press of the release button 19.

Figure 2:
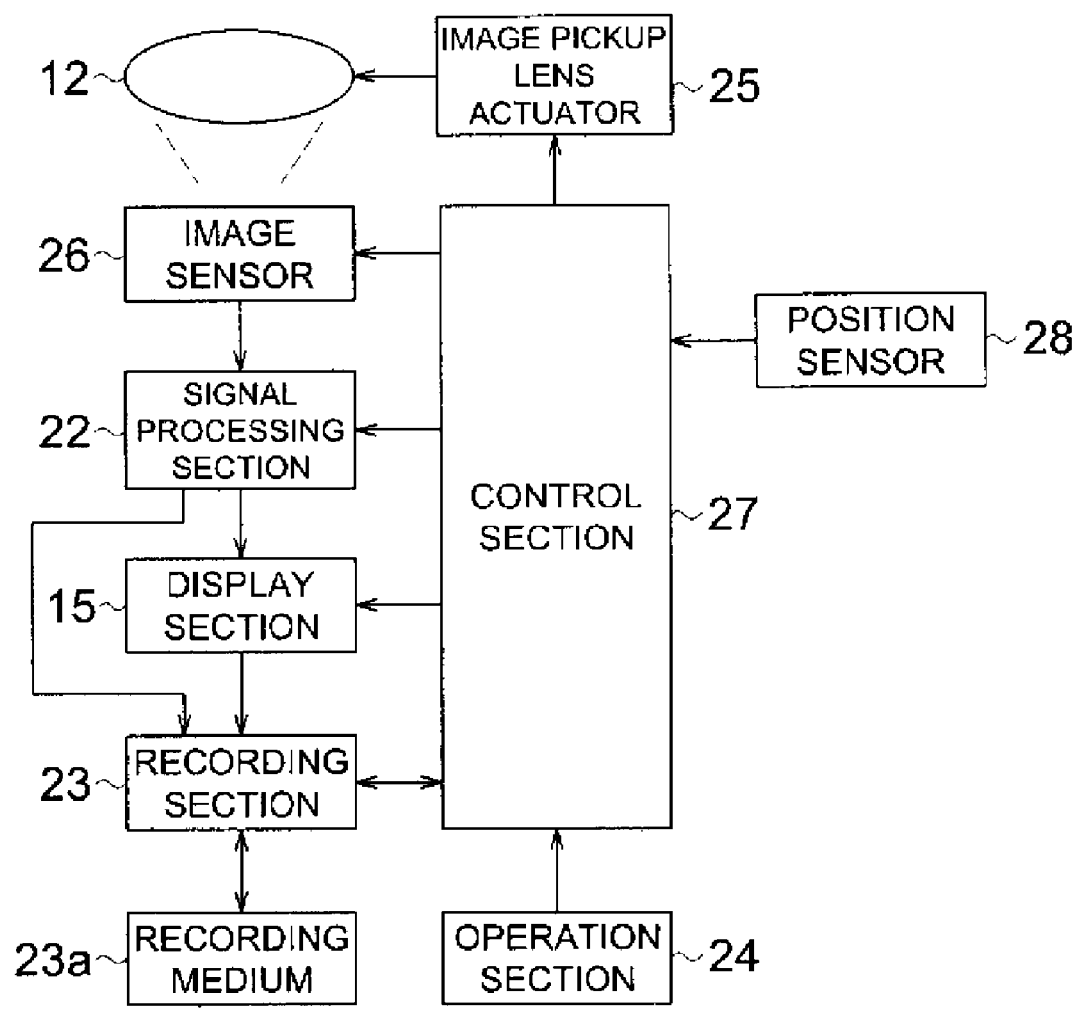
FIG. 2 is a drawing schematically illustrating the configuration of the digital camera of the present invention.

The configuration of the digital camera 1 is schematically illustrated in FIG. 2. The digital camera 1 includes an image sensor 26, a signal processing section 22, a recording section 23, an operation section 24 and an image pickup lens actuator 25 and a control section 27 besides the lens unit 12 and the display section 15. The image sensor 26 is a CCD area sensor and outputs the signal representing the received light amount for each pixel. The signal processing section 22 processes the output signal of the image sensor 26 to generate the image data representing the photographed image. The recording section 23 records the image data, which the signal processing section 22 has generated, on a removable recording medium 23a, and reads image data from the recording medium 23a for reproducing and displaying an image. The operation section 24 is a general term for the mode setting switch 16, the cross key 17, the operation key 18, the release button 19 and the power button 20, and transmits the information with respect to the button, operated by the user, to the control section 27.

The image pick-up lens actuator 25 performs a drive control of motors such as the motor for zooming, the motor for focusing and the motor for shutter-diaphragm, which carries out exposure regulation. The image pick-up lens actuator 25 may be provided on the lens unit 12.

The control section 27 controls operation of each part of the digital camera 1 according to a control program and has a function for executing a series of the following operations. When the release button 19 is half-pressed, it executes a preparation operation for photographing photographic objects such as a setup of exposure control values and focusing, and when the release button 19 is fully pressed, the image sensor 26 will be exposed. The control section 27 performs predetermined image processing to the picture signal acquired by the exposure and records it on the recording medium 23a.

FIRST EMBODIMENT

Next, the configuration of the lens unit 12 will be described as a first embodiment of the present invention.

Figure 3:
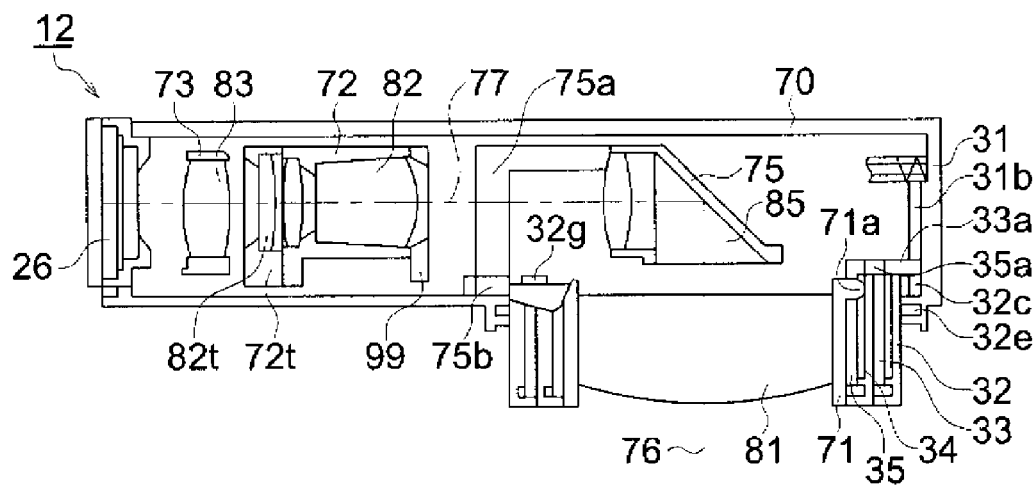
FIG. 3(a) and FIG. 3(b) are a perspective side view and a perspective front view, respectively, illustrating the structure of a wide angle state of the lens unit of a first embodiment of the present invention.
Figure 3:
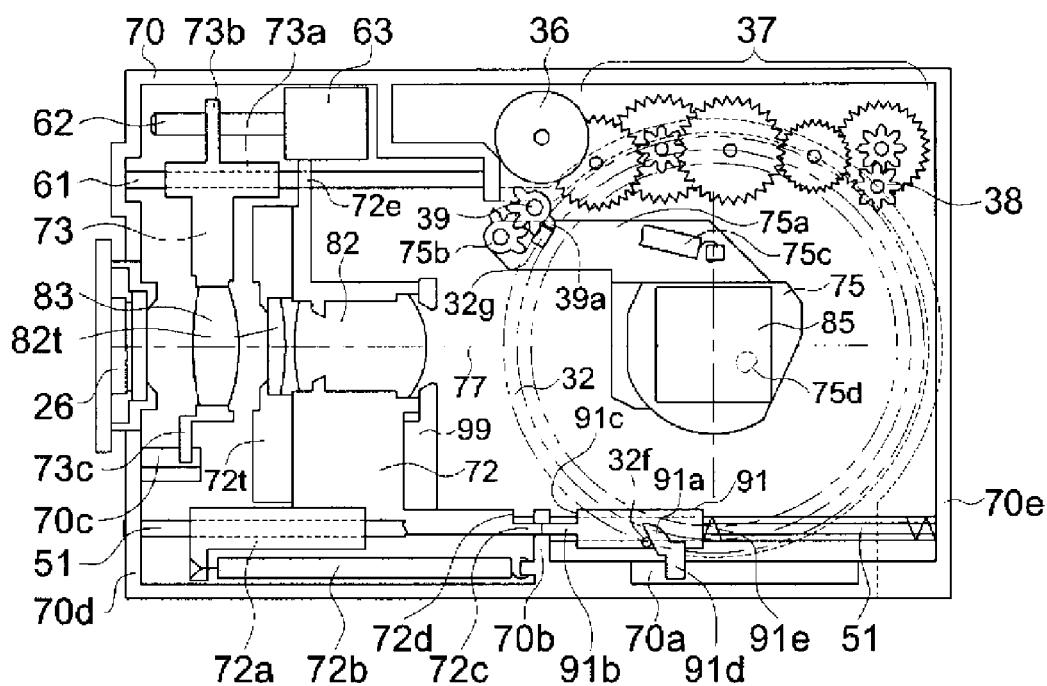
Figure 5:
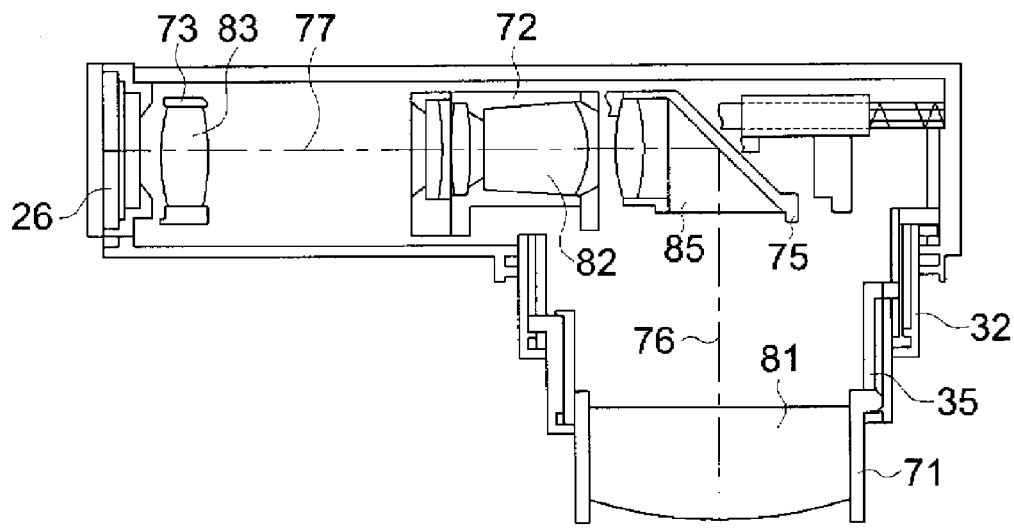
FIG. 5(a) and FIG. 5(b) are a perspective side view and a perspective front view, respectively, illustrating the structures of the telephoto state of the lens unit of the first embodiment of the present invention.
Figure 5:
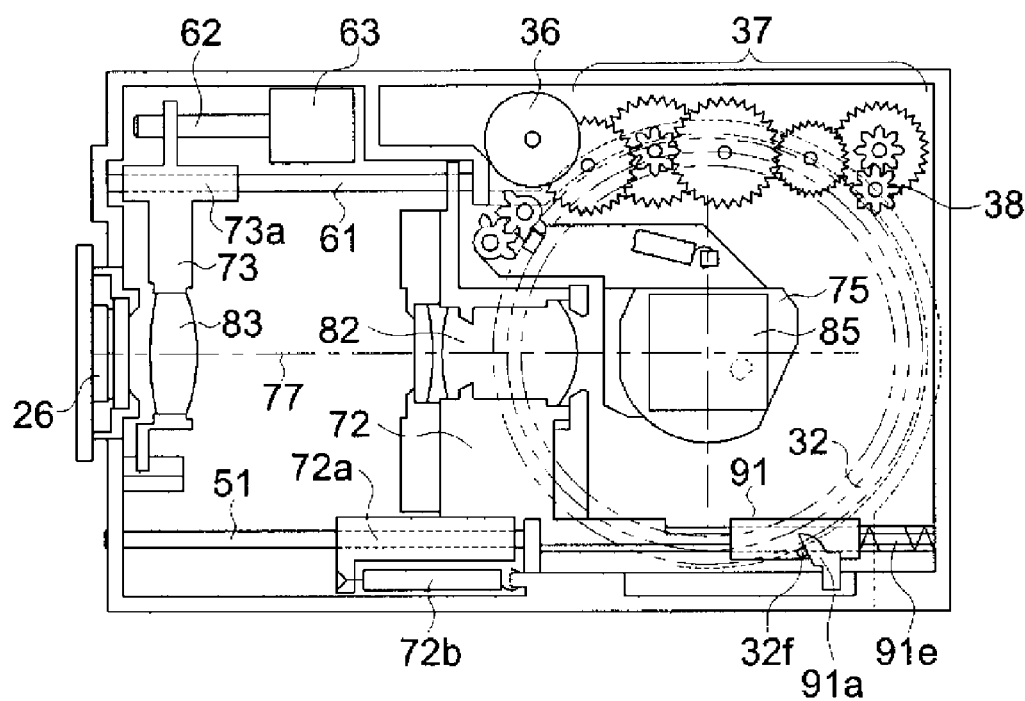
Figure 6:
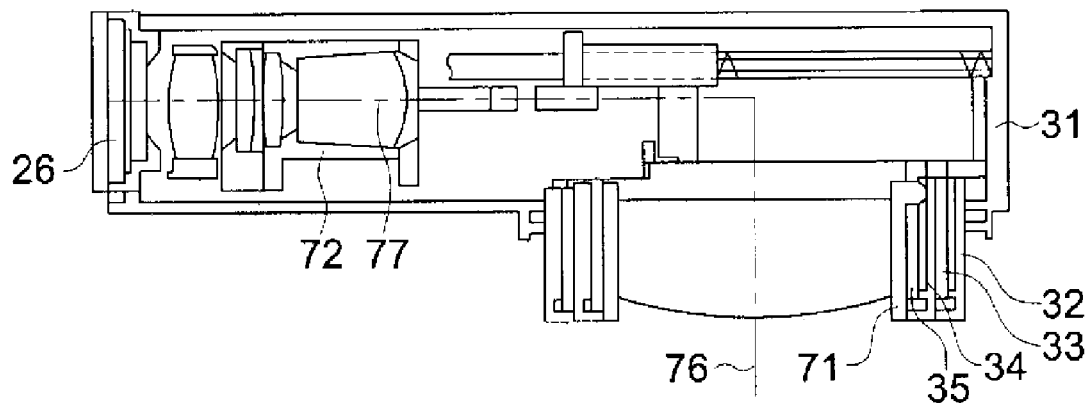
FIG. 6(a) and FIG. 6(b) are a perspective side view and a perspective front view, respectively, illustrating the structures in a prism evacuated status of the lens unit of the first embodiment of the present invention.
Figure 6:
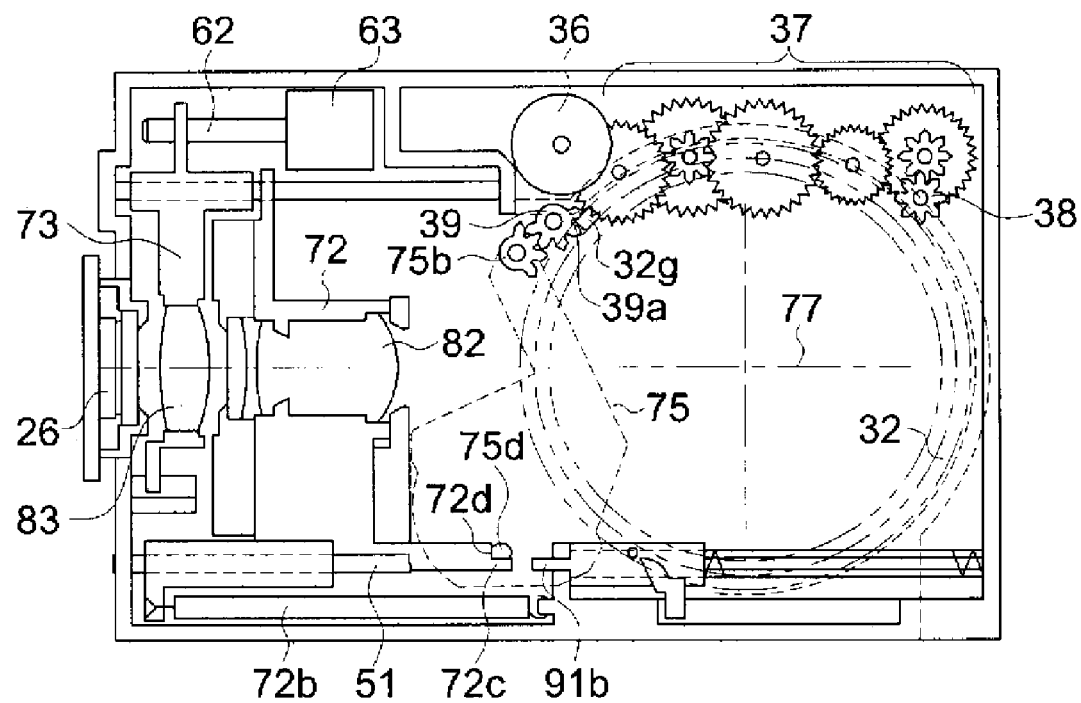
Figure 7:
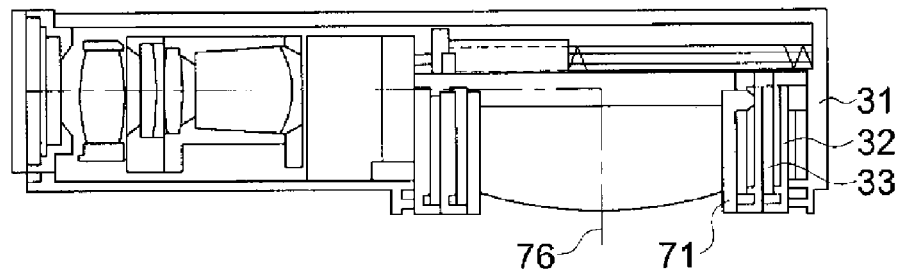
FIG. 7(a) and FIG. 7(b) are a perspective side view and a perspective front view, respectively, illustrating the structures of a storage state of the lens unit of the first embodiment of the present invention.
Figure 7:
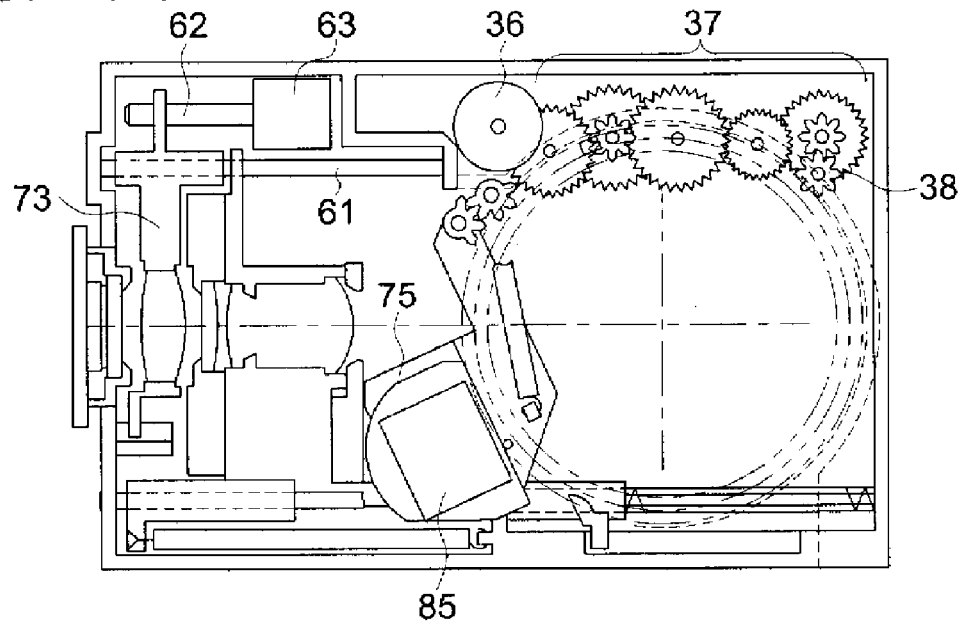

FIG. 3(a) and FIG. 3(b) illustrate a wide angle state of the lens unit 12, FIG. 5(a) and FIG. 5(b) illustrate the telephoto state of the lens unit 12, FIG. 6(a) and FIG. 6(b) illustrate the evacuated status of the prism, and FIG. 7(a) and FIG. 7(b) illustrate the storage state of the lens unit 12. The (a) of each Figure shows a perspective side view and the (b) of each figure shows a perspective front view. In FIG. 3(b), FIG. 5(b), FIG. 6(b) and FIG. 7(b), the first lens group, which is a lens group in the object side, and the first support member holding the lens group are excluded, and the two-doted chain line indicates a rotary cylinder.

Firstly, FIG. 3(a) and FIG. 3(b) explain the configuration of the lens unit 12.

The image pickup lens is provided with a first lens group 81, a prism 85, a second lens group 82 containing a hand shake correcting lens group 82t, and a third lens group 83 in this order from the photographic object side. The first lens group 81 is positioned on a first optical axis 76, and the second lens group 82 and the third lens group 83 correspond to a following lens and are on a second optical axis 77. The image pickup lens performs image formation of the light beam from a photographic object onto the image sensor 26.

The prism 85 is a triangular prism having a cross section of a right-angled isosceles triangle. The prism 85 is arranged with its slope having angles of 45 degrees relative to the first optical axis 76 and the second optical axis 77, and the first optical axis 76 is bent to the direction of the second optical axis 77 at substantially right angle.

With respect to the variable magnification, the first lens group 81, the second lens group 82 and the third lens group 83 move, further, the hand shake correcting lens group 82t moves together with the second lens group 82, and when focusing, the third lens group 83 moves.

With respect to a collapsing operation, the third lens group 83 moves toward the image sensor 26 on the second optical axis 77, and the second lens group 82 evacuates to the space which has been formed by the movement of the third lens group 83. The prism 85 rotates and moves to the space formed by the movement of the second lens group 82. And the first lens group 81 moves along the first-optical-axis 76 and to be stored in the space formed by the movement of the prism 85.

A first support member 71 supports the first lens group 81, a prism support member 75 supports the prism 85, a second support member 72 supports the second lens group 82 and a third support member 73 supports the third lens group 83. The prism 85 constitutes a bending member and the prism support member 75 constitutes a bending member supporting member. A mirror may be applicable as a bending member instead of the prism 85. A hand shake correcting unit 72t supports a hand shake correcting lenses 82t perpendicularly movable relative to the second optical axis 77 to correct the deviation of the optical axis caused by hand shake. A shutter unit 99 is fixed on the second support member 72.

Next, a structure for zooming movement will be described. When zooming is performed to a telephoto end from a wide angle end, the first lens group 81 will move toward the photographic object, the second lens group 82 will move toward the prism 85, and the third lens group 83 will move toward the image sensor 26.

The configuration for carrying out zooming movement of the first support member 71 supporting the first lens group 81 has a fixed cylinder 31, a rotary cylinder 32 and a linearly-moving cylinder 33, which move together, and a variable magnification rotary cylinder 34 and a variable magnification linearly-moving cylinder 35, which move together.

The fixed cylinder 31 is fixed to a chassis 70 and has a cylindrical shape centering on the first optical axis 76. The rotary cylinder 32 rotates without moving in the first-optical-axis 76 direction with respect to the fixed cylinder 31. The linearly-moving cylinder 33 performs relative rotation to the rotary cylinder 32, and does not move in the first-optical-axis 76 direction. In the more internal side, the variable magnification rotary cylinder 34 moves in the first-optical-axis 76 direction while rotating relative to the linearly-moving cylinder 33. The variable magnification linearly-moving cylinder 35 performs a linear movement in the first-optical-axis 76 direction together with the variable magnification rotary cylinder 34. And in variable magnification linearly-moving cylinder 35, the first support member 71 is held so that a linear movement may be possible in the first-optical-axis 76 direction. The variable magnification rotary cylinder 34 and the variable magnification linearly-moving cylinder 35 which perform a linear movement in the first-optical-axis 76 direction together with the variable rotary cylinder 34 constitute a zooming movable cylinder. The zooming movable cylinder and the linearly-moving cylinder 33 configure a first zooming movement member.

When a first motor 36, which is an actuator, rotates, the rotation driving force slowed down by a reduction gear array 37 is transmitted to the rotary cylinder 32 via a long gear 38. When the rotary cylinder 32 rotates, the variable magnification linearly-moving cylinder 35 is pushed out, and also the first support member 71 is pushed out to the photographic object side, and it extends to the telephoto end. A detailed configuration will be described later.

Next, with respect to the configuration of a zooming movement of the second support member 72, a guide shaft 51 is arranged in parallel with the second optical axis 77, and its both ends are fixed to wall surfaces 70d and 70e of the chassis 70. The guide shaft 51 is held by a shaft holding section 70b at the vicinity of its center so that it may not incline. The guide shaft 51 is fitted in a sliding guide hole 72a of the second support member 72 which is a guide section, and guides the second support member 72 so as to move it in the direction of the second optical axis 77 without inclining to the second optical axis 77. A rotation stop section 72e engages with a third guide shaft 61 so that the second support member 72 is prevented from rotating around the optical axis. Further, in order to realize a structure that enables the second support member 72 to linearly move in the second optical axis direction 77, the second support member 72 may be slidably fitted in a cylinder fixed to the chassis 70.

Furthermore, the second support member 72 is spring energized in the second-optical-axis 77 direction and to the prism 85 side by a second spring 72b. An interlocking shaft 91 is energized to the image sensor 26 side by an interlocking spring 91e which has energizing force stronger than the second spring 72b. A variable magnification contact section 72c is always in contact with a variable magnification contact projection section 91b of an interlocking shaft 91 in a zooming region. Although spring energization is performed to the prism 85 side, the second spring 72b may be provided between the second support member 72 and the chassis 70, and may be provided between the second support member 72 and the interlocking shaft 91. The interlocking shaft 91 is movably fitted in the second guide shaft 51, the linearly-moving projection 91d is fitted in the guide groove 70a of the chassis 70, and is linearly guided. The interlocking shaft 91 is provided thereon with a variable magnification interlocking section 91a, and the variable magnification interlocking section 91a is always in contact with the variable magnification linkage projection 32f of the rotary cylinder 32 in the zooming region with the spring energizing force of the interlocking spring 91e. When the interlocking shaft 91 contacts the shaft holding section 70b of the chassis 70 at the time of a collapsing operation, the contact relations of the variable magnification linkage projection 32f of the rotary cylinder 32 with the variable magnification interlocking section 91a is disengaged and the contact relations with the second support member 72 is also disengaged.

When the first motor 36 rotates, the rotary cylinder 32 rotates counterclockwise via the reduction gear array 37 and the long gear 38, and the variable magnification linkage projection 32f which contacts the variable magnification interlocking section 91a resists the interlocking spring 91e, and pushes the interlocking shaft 91 rightward of FIG. 3(b). As a result, the second support member 72 follows the interlocking shaft 91 in contact with the interlocking shaft 91 by the spring energizing force of the second spring 72b, and moves toward the prism 85 and to the telephoto end.

In addition, in order to change the rotation force of the rotary cylinder 32 into the driving force in the second-optical-axis 77 direction, the interlocking shaft 91 is provided movable in the direction of the second optical axis 77, and it is interlocked with the rotary cylinder 32 rotary cylinder. However, a gear may be provided in the perimeter of the rotary cylinder 32, and the gear may be meshed with a rack provided on the second support member 72 to be movable in the direction of the second optical axis 77. Otherwise, a bevel gear may be engaged between the rotary cylinder 32 and the second support member 72 to change the direction of the driving force.

With respect to the configuration of the zooming movement of the third support member 73, the third guide shaft 61 is arranged parallel to the second optical axis 77, its one end is fixed to the wall surface 70d of the chassis 70, and the other end is fixed to the central wall surface 70d. The third guide shaft 61 fits into the third sliding guide hole 73a of the third support member 73, and the third support member 73 is guided to be movable in the direction of the second optical axis 77 without inclining with respect to the second optical axis 77. The rotation stop section 73C engages with the regulation section 70C of the chassis 70 to prevent the third support member 73 from rotating around the optical axis when it moves. A third driving shaft 62 engaged with the rotation shaft of the third motor 63 is arranged parallel to the second optical axis 77. A spiral screw is formed on the peripheral surface of the third driving shaft 62, which is engaged with an engaging screw 73b of the third support member 73.

When the third motor 63 rotates, by the lead of the third driving shaft 62, the third support member 73 moves toward the image sensor 26 side and reaches the telephoto end.

Next, the detailed structure for zooming movement of the first support member 71 will be explained by using FIGS. 4(a)-4(f), and the change between the zooming operation and the collapsing operation will also be explained.

Figure 4:
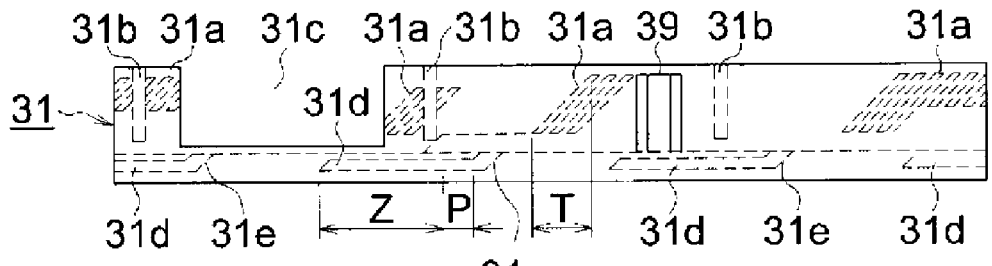
FIG. 4(a) illustrates a development view of a fixed cylinder of the lens unit of the first embodiment of the present invention.
FIG. 4(b) illustrates the development view of a rotary cylinder.
FIG. 4(c) illustrates the development view of a linearly-moving cylinder.
FIG. 4(d) illustrates the development view of a variable magnification rotary cylinder.
FIG. 4(e) illustrates the development view of a variable magnification linearly-moving cylinder and FIG. 4(f) illustrates the development view of a first support member.
Figure 4:
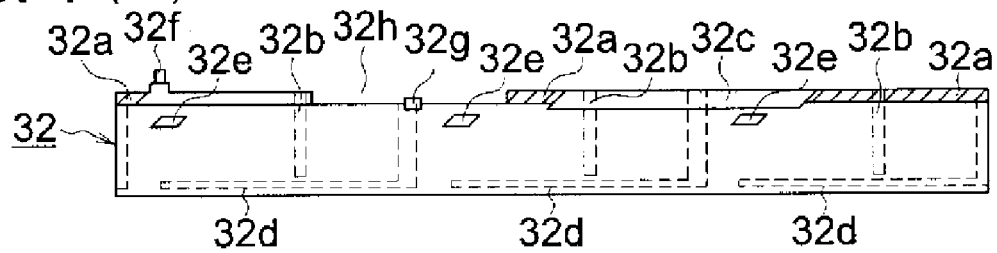
Figure 4:
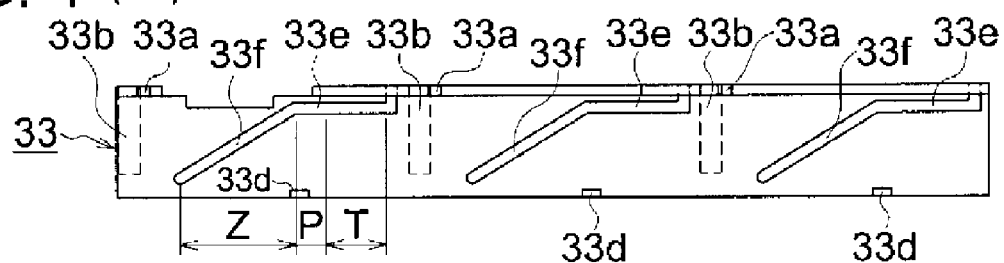
Figure 4:
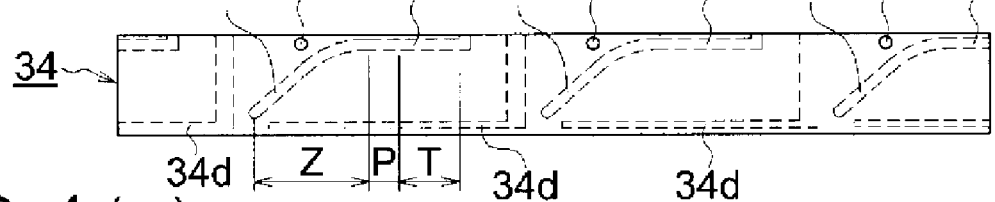
Figure 4:
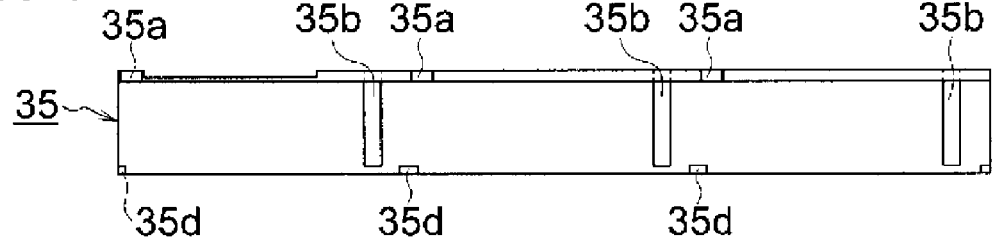
Figure 4:

FIGS. 4(a)-4(f) are development views in the wide angle end seen from the outer side of the fixed cylinder 31, and the lower side of the figures is a photographic object side. FIG. 4(a) illustrates a development view of a fixed cylinder 31, FIG. 4(b) illustrates the development view of a rotary cylinder 32, FIG. 4(c) illustrates a development view of a linearly-moving cylinder 33, FIG. 4(d) illustrates a development view of a variable magnification rotary cylinder 34, FIG. 4(e) illustrates a development view of a variable magnification linearly-moving cylinder 35 and FIG. 4(f) illustrates a development view of a first support member 71.

The fixed cylinder 31 is provided with an opening 31C which is a notch section, an internal helicoid 31a which is a female helicoid, three straight grooves 31b elongated in the first-optical-axis 76 direction (the up-and-down direction of FIGS. 4(a)-(f)) and three circumference grooves 31d and a lead-in groove 31e which extended to the circumference grooves 31d on internal circumference of the fixed cylinder 31. By forming the overlapped portion where the position of opening of the opening 31C and the opening 32h, which is the notch sections of the rotary cylinder 32, are overlapped each other, the space, which prism support member 75 can move in and out at the time of a collapsing operation, is formed. Further, a shutter unit 99 moves in and out the opening 31C at the time of zooming.

The internal helicoid 31a screws with the external helicoid 32a which is an extending member formed in the rotary cylinder 32, which will be described later, within the range of the rotation angle T, as shown in FIG. 4(a), and when the rotary cylinder 32 rotates, the internal helicoid will move the rotary cylinder 32 in the first-optical-axis 76 direction. The range of the rotation angle T is a region where the first support member 71 moves to a storage position from the usage position of a wide angle end, and the rotation angle T is defined as a first lens group collapsing region. The internal helicoid 31a and the external helicoid 32a screwed with the internal helicoid 31a configure a first moving member. The cam follower which fits into a lead groove and the groove may be used for the delivery mechanism of the first moving member instead of the helicoid.

A lead-in groove 31e is formed with the same lead as the internal helicoid 31a, and its one end is widely opened so that a lozenge follower 32e of the rotary cylinder 32 described later is introduced in.

The circumference groove 31d is a groove extending in the direction of the circumference. As shown in FIG. 4(a), a zooming region Z for changing from the wide angle end to the telephoto end, and a prism insertion-and-detachment region P where the prism 85 moves between the usage position and the storage position are formed, and the circumference groove 31d is continuously formed with the lead-in groove 31e. The prism insertion-and-detachment region P is a region where the prism 85 is moved from the bending position of the optical axis at which light flux is bent into the second-optical-axis 77 direction from the first optical axis 76, to an evacuation position which is away from the optical axis. In this prism insertion-and-detachment region P, in the predetermined time within which a prism moves to the evacuation position from the bending position, a first support member does not move on the first-optical-axis 76, and will be in the state where the first support member stops. The region of the opening 31C of the fixed cylinder 31 and the opening 32h of the rotary cylinder 32 overlap in this prism insertion-and-detachment region P.

The rotary cylinder 32 is provided with a variable magnification linkage projection 32f which contacts the interlocking shaft 91 described above and a collapsing interlock section 32g of a pin shape on the end surface of the upper portion of FIG. 4(b), and provided with three straight grooves 32b elongated in the up-and-down direction of FIG. 4(b) and three bayonet sections 32d on the internal surface of the rotary cylinder 32. In order to insert the mating member to be fitted in at the time of assembly, provided are the grooves which extend from the bayonet sections 32 in the up-and-down direction. Its peripheral surface is equipped with external helicoids 32a which are male helicoids, a lozenge follower 32e and a circumference gear 32a. The circumference gear 32a meshes with a long gear 39 rotatably attached to the chassis 70.

The External helicoid 32a is a male helicoid, which meshes with the internal helicoid 31a of the fixed cylinder 31. The external helicoid 32a is formed in the upper edge of the rotary cylinder 32 of FIG. 4(b), and screws with the internal helicoid 31a in the first lens group collapsing region T. The external helicoid 32a does not screw with the internal helicoid 31a in the zooming region Z or the prism insertion-and-detachment region P.

The lozenge follower 32e is engaged with the lead-in groove 31e of the fixed cylinder 31 at its right and left slopes, and engages with the circumference groove 1d at its upper and lower surfaces. When the lozenge follower 32e is being engaged in the zooming region Z of the circumference groove 31d and the prism insertion-and-detachment region P, the rotary cylinder 32 does not move in the first-optical-axis 76 direction in response to the rotation of the rotary cylinder 32. At the place where the lozenge follower 32e engages with the lead-in groove 31e, the external helicoid 32a begins to screw with the internal helicoid 31a, and when the rotary cylinder 32 rotates, the external helicoid 32a screws with the internal helicoid 31a, and the rotary cylinder 32 is rotated and moved in the first-optical-axis 76 direction (the up-and-down direction of FIG. 4(b)) by the helicoid lead. In addition, the lozenge follower 32e may be circular instead of lozenged.

That is, when the rotary cylinder 32 rotates leftward of FIGS. 4(a)-(f) from the wide angle end state indicated in FIG. 4(a) and FIG. 4(b), it is within the zooming region Z, and the rotary cylinder 32 will rotate rotary cylinder but not move in the first-optical-axis 76 direction. On the contrary, when the rotary cylinder 32 rotates rightward from the state of FIGS. 4(a)-(f), firstly, it reaches the prism insertion-and-detachment region P. The rotary cylinder 32 is only rotating and the rotary cylinder 32 does not move in the first-optical-axis 76 direction. When rotary cylinder 32 rotates further rightward, the rotary cylinder 32 reaches the first lens group collapsing region T, and the rotary cylinder 32 will rotate and move toward the prism 85 (on FIGS. 4(a)-(f)) of the first optical axis 76.

A linearly-moving cylinder 33 rotatably fits in the rotary cylinder 32 and is provided with three penetrated circumference holes 33e extended in the circumference direction and lead holes 33f each having a lead shape extended to the circumference hole 33e. The peripheral surface is equipped with straight ribs 33a which engage with the straight grooves 31b of the fixed cylinder 31, and the bayonet claw sections 33d, and the inner circumference surface is equipped with straight grooves 33b elongated in the up-and-down direction.

The lead hole 33f forms the zooming region Z, and the circumference hole 33e forms the prism insertion-and-detachment region P near the wide angle end side of the zooming region Z and also forms the first lens group collapsing region T.

Since the bayonet claw sections 33d engages with bayonet section 32d and the straight rib 33a is engages with the straight groove 31b, the linearly-moving cylinder 33 can rotate relative to the rotary cylinder 32, and the linearly-moving cylinder 33 performs a linear movement in the first optical axis 76d direction together with the rotary cylinder.

A variable magnification rotary cylinder 34 rotatably fits in the linearly-moving cylinder 33, and is provided with three cam followers 34a on the external surface. On the internal surface, there are provided bayonet sections 34d, three circumference grooves 34e, which are extended in the circumference direction, and cam grooves 34f extending to the circumference grooves 34e.

The cam follower 34a engages with the straight groove 32b of the rotary cylinder 32 and the circumference holes 33e, of the linearly-moving cylinder 33, or the lead holes 33f. When the rotary cylinder 32 rotates in the region, where it is engaging with the lead hole 33f, the variable magnification rotary cylinder 34 rotates and moves, guided by the lead hole 33f, in the first-optical-axis 76 direction. In the region in which the cam follower 34a engages with the circumference hole 33e, the rotation of the rotary cylinder 32 makes the variable magnification rotary cylinder 34 rotate but move in the first-optical-axis 76 direction.

That is, the variable magnification rotary cylinder 34 always rotates together with the rotary cylinder 32 as one body, and in the zooming region Z, the variable magnification rotary cylinder 34 moves in the first-optical-axis 76 direction. In the prism insertion-and-detachment region P and the first lens group collapsing region T, the variable magnification rotary cylinder 34 does not move in the first-optical-axis 76 direction with respect to the rotary cylinder 32.

The variable magnification linearly-moving cylinder 35 rotatably fits in the variable magnification rotary cylinder 34, and is provided with three penetrated straight holes 35b, straight ribs 35a, which engage with the straight grooves 33b of the linearly-moving cylinder 33, and three bayonet claw sections 35d on the external surface.

Since the bayonet claw section 35d engages with the bayonet section 34d and the straight rib 35a engages with the straight groove 33b, the variable magnification linearly-moving cylinder 35 can rotate with respect to the variable magnification rotary cylinder 34, and moves straight in the direction of the first optical axis 76 as one body with the variable magnification rotary cylinder 34.

That is, the variable magnification linearly-moving cylinder 35 performs a linear movement in the first-optical-axis 76 direction with respect to the variable magnification rotary cylinder 34 as one body in the zooming region Z, and does not move in the prism insertion-and-detachment region P or the first lens group collapsing region.

The cam followers 71a are fixed on the first support member 71. The cam followers 71a engage with the circumference grooves 34e of the variable magnification rotary cylinder 34 or the cam grooves 34f and the straight hole 35b of the variable magnification linearly-moving cylinder 35. When the variable magnification rotary cylinder 34 rotates in the region where the cam followers 71a engage with the cam grooves 34f, the first support member 71 carries out a linear movement, guided by the cam shape of the cam groove 34f, in the first-optical-axis 76 direction. In the region where the cam followers 71a engage with the circumference grooves 34e, even if the rotary cylinder 34 rotates, the first support member 71 does not rotate or move in the first-optical-axis 76 direction in response to the rotation of the variable magnification rotary cylinder 34.

That is, the first support member 71 performs a linear movement in the first-optical-axis 76 direction with respect to the variable magnification linearly-moving cylinder 35 in the zooming region Z, and does not move in the prism insertion-and-detachment region P or the first lens group collapsing region.

Returning to FIG. 3(a) and FIG. 3(b), and a collapsible structure will be explained.

At the time of collapsing, the first support member 71, the prism support member 75, the second support member 72, and the third support member each move.

Firstly, the structure for evacuating the prism support member 75 will be explained. As shown in FIG. 3(a), an L-shaped arm 75a is elongated toward the first support member 71 side, a partially toothed gear 75b is attached to the arm 75a, and the prism support member 75 is held, to be rotatable about the axis of gear 75b, on the chassis 70. A pull spring 75C provided on the arm 75a always makes the prism support member 75 be in contact with a stopper (not shown) in the bending position. The interlocking gear 39 is rotatably journaled on the chassis 70, and meshes with the gear 75b. The interlocking gear 39 is provided with a collapsing linkage projection 39a which contacts a collapsing interlock section 32g of the rotary cylinder 32 is provided. When the gear 75b and the interlocking gear 39 which gears with the gear 75b are disposed at the position which is outside of the rotation operation of the rotary cylinder 32 in FIG. 3(b), and is the vicinity where a shutter unit 99 of the second support member 72 in the image sensor 26 side is not arranged, the lens unit 12 will become small. A collapsing contact projection 75d which contacts a collapsing contact section 72d of the second support member 72, which will be described late, is provided on the prism support member 75. The interlocking gear 39 and the gear 75b configure a bending member moving member, and the collapsing interlock section 32g and the collapsing linkage projection 39a which contacts the collapsing interlock section 32g constituting a transfer member.

When the first motor 36 is driven in the state of the wide angle end, the rotation driving force which has been slowed down by the reduction gear array 37 will be transmitted to the rotary cylinder 32 via the long gear 38. Then the rotary cylinder 32 rotates to the right-hand side from the intersection of the zooming region Z and the prism insertion-and-detachment region P which is shown in FIG. 4(a) and FIG. 4(b) (in FIG. 3(b), a clockwise rotation). The collapsing interlock section 32g rotates the gear 75b via the interlocking gear 39, and the opening 31C and the opening 32h overlap each other to make the space into which a prism support member can move. After that, the prism support member 75 rotates clockwise about the axis of the gear 75b and reaches the evacuation position.

As described above, the opening 31C is formed in the fixed cylinder 31 and the opening 32h is formed on the rotary cylinder 32, and those spaces overlap each other to make a notch portion through which the prism support member 75 can rotate and move to the evacuation position. This arrangement can pull in the zooming movement mechanism of the lens which is in the photographic object side from the prism into the prism side. Accordingly, the length of the projected portion, of the lens which is in the photographic object side from the prism, can be shortened at the telephoto end. Further, the lens which is in the photographic object side from the prism can be collapsed without interfering with the prism. In addition, in the prism insertion-and-detachment region P, the first support member 71 does not move in the optical axis direction.

Although the driving force is transmitted by the interlocking gear 39 interlocking the rotary cylinder 32 with the prism support member 75, a gear may be provided on the rotary cylinder 32 to directly transmit the driving force to the gear of the prism support member 75. Alternatively, a projection may be provided on the rotary cylinder 32, and another projection which engages with the projection on the rotary cylinder 32 may be provided on the prism support member 75 to transmit the driving force.

Next, the structure for evacuating the second support member 72 will be explained. The evacuation structure for the second support member 72 uses the structure for zooming movement of the second support member 72. That is, a rotation stop section 72e provided on the second support member 72 engages with a third guide shaft 61, and a guide shaft 51 is slidably inserted in a guide hole 72a.

In the state of the wide angle end, on the way to the evacuation position to which the prism support member 75 rotates and reaches, when the collapsing contact projection 75d of the prism support member 75 contacts the collapsing contact section 72d of the second support member 72, and the prism support member 75 rotates further, the second support member 72 is pushed by the collapsing contact projection 75d, and the second support member 72 slides, against the second spring 72b, on the guide shaft 51 and reaches the evacuation position in the side of image sensor 26. The collapsing contact section 72d is provided near the sliding guide hole 72a, and the second support member 72 slides on the guide shaft 51 smoothly.

Next, the structure for storing the first support member 71 will be explained. Storage of the first support member 71 is performed by the rotary cylinder 32 and the linearly-moving cylinder 33. That is, the right end of the prism insertion-and-detachment region P indicated in FIG. 4(a) is a position where the lozenge follower 32e of the rotary cylinder 32 engages with the lead-in groove 31e in the fixed cylinder 31. When the rotary cylinder 32 rotates from that position, the rotary cylinder 32 will rotate and move, along the lead of the lead-in groove 31e, to the prism 85 side (the upper side of FIGS. 4(a)-(f)) in the first-optical-axis 76 direction. Simultaneously, the external helicoid 32a begins to screw with the internal helicoid 31a. In this case, the bayonet claw sections 33d of the linearly-moving cylinder 33 engage with the bayonet sections 32d and the straight ribs 33a is engaging with the straight groove 31b, therefore, when the rotary cylinder 32 rotates, the linearly-moving cylinder 33, which is rotatable with respect to the rotary cylinder 32, moves straight to the prism 85 side (it is the upper portion of FIGS. 4(a)-(f)) in the first-optical-axis 76 direction as one body. Since the cam follower 34a of the variable magnification rotary cylinder 34 engages with the circumference hole 33e (the first lens group collapsing region T), when the linearly-moving cylinder 33 moves straight, the variable magnification rotary cylinder 34, the variable magnification linearly-moving cylinder 35 and the first support member 71 move toward the prism 85 (upper side of FIGS. 4(a)-(f)) of the first-optical-axis 76 direction together with the linearly-moving cylinder 33 as one body.

When the first motor 36 illustrated in FIGS. 3(a) and 3(b) is driven with the prism support member 75 having been evacuated, the rotation driving force slowed down by the reduction gear array 37 is transmitted to the rotary cylinder 32 via the long gear 38. Then, the rotary cylinder 32 rotates, by the helicoid screw, to the right-hand side in the first lens group collapsing region T illustrated in FIG. 4(a), and the linearly-moving cylinder 33 and the first support member 71 perform relative rotation with respect to the rotary cylinder 32, perform the linear movement to the prism 85 side in the first-optical-axis 76 direction and reach the storage position as one body.

Next, the structure for evacuating the third support member 73 will be explained. The evacuation structure for the third support member 73 illustrated in FIGS. 3(a) and 3(b) uses the structure for zooming movement of the third support member 73. That is, the rotation stop section 73C provided on the third support member 73 engages with the regulation section 70C, and the third guide shaft 61 is slidably assembled in the third sliding guide hole 73a.

When the third motor 63 is driven, by the lead of the third driving shaft 62, in the state of the wide angle end the third support member 73 will slide on the third guide shaft 61 and reach the evacuation position in the image sensor 26 side.

The operations will be explained. Firstly, the zooming operation will be explained by using FIGS. 3(a), 3(b), 5(a) and 5(b).

When zooming is performed from the wide angle state illustrated in FIGS. 3(a) and 3(b) to the telephoto side, the first lens group 81 will move toward the photographic object, the second lens group 82 will move toward the prism 85, and the third lens group 83 will move toward the image sensor 26, then the telephoto state illustrated in FIGS. 5(a) and (b) will be realized.

When the cross key 17 of the digital camera 1 of FIGS. 1(a), 1(b) and 2 is operated to firstly set the lens at the telephoto end from a wide angle end, the image pickup lens actuator 25 will drive the first motor 36 and the third motor 63 based on the zoom control signal outputted from the control section 27.

When the first motor 36 rotates in the wide angle state of FIGS. 3(a) and 3(b), the rotation driving force slowed down by the reduction gear array 37 will be transmitted to the rotary cylinder 32 via the long gear 38. When the rotary cylinder 32 rotates, the variable magnification linearly-moving cylinder 35 will be extended out, and also the first support member 71 will be extended out to the photographic object side, and reaches the wide angle end.

FIGS. 4(a)-4(f) will explain the zooming extension operation of the first support member 71 in detail. When the rotary cylinder 32 rotates leftward in the zooming region Z of the circumference groove 31d, the rotary cylinder 32 will not move in the first-optical-axis 76 direction, but the linearly-moving cylinder 33 and the rotary cylinder 32 perform relative rotation. Since the cam follower 34a of the variable magnification rotary cylinder 34 engages with the straight groove 32b and the lead hole 33f, the variable magnification rotary cylinder 34 is rotated and extended outwardly by the lead of a lead hole 33f. The variable magnification linearly-moving cylinder 35 is extended outwardly, guided by the lead of the lead hole 33f, in the first-optical-axis 76 direction. When the variable magnification rotary cylinder 34 rotates, the cam follower 71a of the first support member 71 will engage with the cam groove 34f and the straight hole 35b, and the variable magnification rotary cylinder 34 and the variable magnification linearly-moving cylinder 35 will perform relative rotation, and then, the first support member 71 is extended straight, guided by the cam shape of 34f of cam grooves, in the first-optical-axis 76 direction. By this zooming operation, the first support member 71 reaches the position of the telephoto end illustrated in FIGS. 5(a) and (b).

Next, returning to FIGS. 3(a) and 3(b) and the zooming operation of the second support member 72 will be explained. When the first motor 36 rotates in the wide angle state, the rotary cylinder 32 rotates via the reduction gear array 37 and the long gear 38, and the variable magnification linkage projection 32f of the rotary cylinder 32 will push the interlocking shaft 91 rightward in FIGS. 3(a) and 3(b) against the interlocking spring 91e. The second support member 72, contacting the interlocking shaft 91 by the spring energizing force of the second spring 72b, follows the interlocking shaft 91, and the second support member 72, which is guided by the guide shaft 51 in the direction of the second optical axis 77 with the guide shaft 51 being fitted in the sliding guide hole 72a, performs a linear movement onto the prism 85 side illustrated in FIGS. 5(a) and (b) to reach the telephoto end.

Next, the zooming operation of the third support member 73 will be explained. When the third motor 63 rotates in the wide angle state of FIGS. 3(a) and 3(b), the third support member 73 moves straight toward the image sensor 26 side reach the telephoto end as illustrated in FIGS. 5(a) and (b) being guided by the lead of the third driving shaft 62 since the third support member 73 is guided in the direction of second optical axis 77 with the third guide shaft 61 being fitted in the third sliding guide hole 73a.

Instead of the above-described operation where the first lens group 81 and the second lens group 82 are simultaneously moved by the first motor 36 and next the third lens group 83 is moved by the third motor 63, the first lens group 81, the second lens group 82 and the third lens group 83 may be moved simultaneously by driving the first motor 36 and the third motor 63 simultaneously.

Next, the collapsing operation will be explained.

When the collapsing operation is performed in the wide angle state illustrated in FIGS. 3(a) and 3(b), firstly, the third lens group 83 will evacuate to the image sensor 26 side. Next, as illustrated in FIGS. 6(a) and (b), the second lens group 82 moves to the evacuation position in the side of the image sensor 26, and at substantially the same time, the prism 85 moves from the bending position to the evacuation position which is off the second optical axis 77 and is outside of the rotation operation region of the rotary cylinder 32. The prism 85 may move to the predetermined evacuation position after the second lens group 82 moves to the evacuation position. Finally, as illustrated in FIG. 7(a), the first lens group 81 moves to the storage position, which is the space from which the prism 85 has evacuated from the usage position and was formed on the first optical axis 76.

Firstly, when a power button 20 of the digital camera 1 of FIGS. 1(a), 1(b) and 2 is pushed off to turn off, the image pickup lens actuator 25 makes the third motor 63 drive, and, next, makes the first motor 36 drive based on the collapsible control signal outputted from the control section 27.

In the wide angle state of FIGS. 3(a) and 3(b), the image pickup lens actuator 25 makes the third motor 63 drive first to move the third support member 73 by the third driving shaft 62 to the evacuation position in the side of image sensor 26, and next, makes the first motor 36 drive.

When the first motor 36 is driven, the rotation driving force slowed down by the reduction gear array 37 is transmitted to the rotary cylinder 32 via the long gear 38. The rotary cylinder 32 rotates to the right-hand side in the prism insertion-and-detachment region P illustrated in FIG. 4(a) and FIG. 4(b) (in FIG. 3(b), a clockwise rotation), and the collapsing interlock section 32g rotates the gear 75b via the interlocking gear 39. As a result, the prism support member 75 rotatingly moves clockwise about the axis of the gear 75b.

When the prism support member 75 rotates, the collapsing contact projection 75d of the prism support member 75 will contact the collapsing contact section 72d of the second support member 72. When the prism support member 75 rotates further, the second support member 72 will be pushed, against the second spring 72b, by the collapsing contact projection 75d, and it will slide on a guide shaft 51, and will reach the evacuation position in the side of the image sensor 26 as illustrated in FIGS. 6(a) and (b). Simultaneously, the prism support member 75 reaches the evacuation position, and the space for the first support member 71 to be stored is formed.

In the state of FIGS. 6(a) and (b), when the rotary cylinder 32 is further rotated by the first motor 36, it will rotatingly move, guided by the leads of the helicoids 31a and 32a, to the prism 85 side (upper side of FIGS. 4(a)-(f)) in the first-optical-axis 76 direction in the first lens group collapsing region T illustrated in FIG. 4(a) and FIG. 4(b). The linearly-moving cylinder 33 which moves, without rotating, straight together with the rotary cylinder 32 moves toward the prism 85 (upper side of FIGS. 4(a)-(f)) in the first-optical-axis 76 direction, and reaches the storage position as illustrated in FIGS. 7(a) and (b). Since the rotary cylinder 32 is catching the collapsing linkage projection 39a of the interlocking gear 39 during collapsing the first support member 71, the prism support member 75 retains the evacuation position. Alternatively, while collapsing the first support member 71, a part of the prism support member 74 may be caught by the upper end surface of the rotary cylinder 32 or the linearly-moving cylinder 33 to retain the evacuation position of the prism support member 75.

In order to switch the lens unit 12 to the usage position from the storage position, the image pickup lens actuator 25 performs the drive control of each motor in the order contrary to the drive operation to the storage position from the usage position. That is, when power button 20 of the digital camera 1 of FIGS. 1(a), 1(b) and 2 is pushed and it turns on, the image pickup lens actuator 25 makes the first motor 36 drive first, and, next, makes the third motor 63 drive based on the image pickup preparation signal outputted from the control section 27.

In the storage state illustrated in FIGS. 7(a) and (b), when the first motor 36 is driven, the rotation driving force slowed down by the reduction gear array 37 is transmitted to the rotary cylinder 32 via the long gear 38. The rotary cylinder 32 rotatingly moves, guided by the lead of the helicoids 31a and 32a, to the photographic object side (lower side of FIGS. 4(a)-(f)) in the first-optical-axis 76 direction in the first lens group collapsing region T illustrated in FIG. 4(a) and FIG. 4(b). The linearly-moving cylinder 33, which moves together with the rotary cylinder 32, moves straight together with the first support member 71, and the first support member 71 reaches the usage position of the wide angle end of first support member 71 illustrated in FIG. 6(a).

In the state of FIGS. 6(a) and (b), when the rotary cylinder 32 is rotated further by the first motor 36, the rotary cylinder 32 will rotate to the left-hand side in the prism insertion-and-detachment region P illustrated in FIG. 4(a) and FIG. 4(b) (a counterclockwise rotation in FIG. 6(b)). The collapsing interlock section 32g releases the engaging with the interlocking gear 39, and the prism support member 75 is pulled by the pull spring 75C, then it rotates counterclockwise about the axis of the gear 75b until it contacts an unillustrated stopper and reaches the bending position in the first optical axis 76 illustrated in FIGS. 3(a) and 3(b).

In FIGS. 6(a) and (b), when the prism support member 75 moves to the bending position, a contact relationship between the second support member 72 and the collapsing contact projection 75d of the prism support member 75 will break. The variable magnification contact section 72C slides, by the spring energizing force of the second spring 72b, on the guide shaft 51 until it contacts the variable magnification contacting projection section 91b of the interlocking shaft 91, and the second support member 72 reaches the usage position of the wide angle end of second support member 72 as illustrated in FIGS. 3(a) and 3(b).

Next, the third motor 63 of FIGS. 7(a) and (b) is driven, and the third support member 73 slides on the third guide shaft 61, and reaches the usage position at the wide angle end.

SECOND EMBODIMENT

Figure 8:
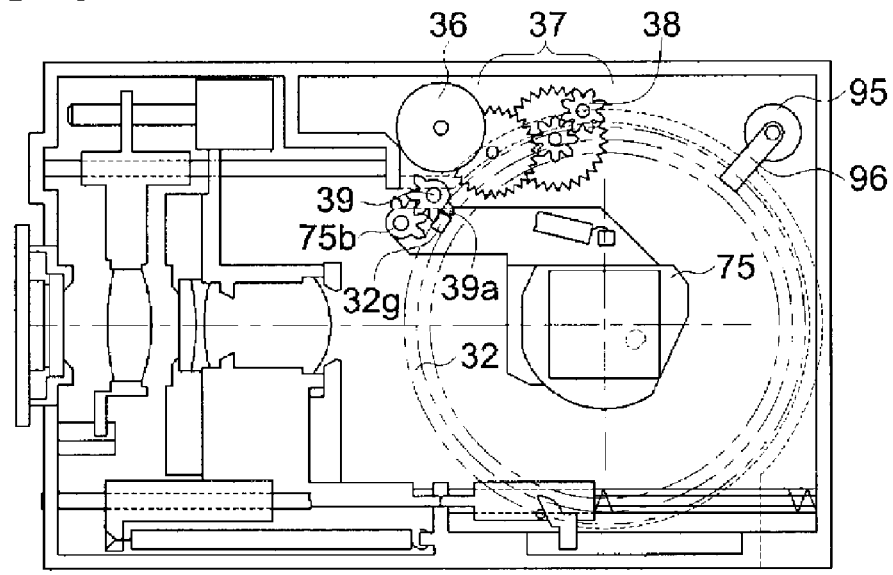
FIG. 8 is a perspective front view illustrating the structure of a wide angle state of the lens unit of a second embodiment of the present invention.

FIG. 8 explains the second embodiment of the lens unit 12.

FIG. 8 is a perspective front view illustrating the wide angle state of the lens unit 12, in which the zooming movement mechanism and the collapsible moving mechanism of the first support member 71 are driven by each driving source. In the following explanation, the same number is given to the member of the same function as the first embodiment, and the duplicated explanation will be omitted.

When the first motor 36, which is a drive source, rotates, the rotation driving force slowed down by the reduction gear array 37 is transmitted to the rotary cylinder 32 via the long gear 38. When the rotary cylinder 32 rotates, although not illustrated, as with the first embodiment, the variable magnification linearly-moving cylinder 33 will move the first support member 71 in the first-optical-axis 76 direction, and will perform the variable magnification. When the rotary cylinder 32 rotates, the gear 75b of the prism support member 75 will be rotated, and the prism support member 75 will be rotated at the circumference of the rotation shaft of the gear 75b from the bending position to the evacuation position. An electromagnetic solenoid 95 is provided as a driving source instead of the helicoid extending member of the first embodiment. When energization control of the electromagnetic solenoid 95 is performed, a driving plate 96, which is integrated with the electro-magnetic solenoid 95, moves the rotary cylinder 32 in the first-optical-axis 76 direction, and the first support member 71 will move between the usage position and the storage position.

In order to switch to the storage position from the usage position in the variable magnification state, the first motor 36 is rotated first, and then the rotary cylinder 32 will rotate and the first support member 71 will be moved to the wide angle end. The rotary cylinder 32 further rotates, and then the prism support member 75 will be rotated about the rotation shaft of the gear 75b from the bending position to the evacuation position. Next, when energization control of the electromagnetic solenoid 95 is performed, the rotary cylinder 32 will be moved in the first-optical-axis 76 direction, and the first support member 71 will move to the storage position from the usage position. In order to switch to the variable magnification state from the storage position, drive control of each drive source is performed in the reverse order to the order of the switching to the storage position from the usage position.

THIRD EMBODIMENT

Next, the structure of a lens unit 13 as a third embodiment will be explained.

In the third embodiment, a mirror is utilized instead of the prism as a bending member.

Figure 9:
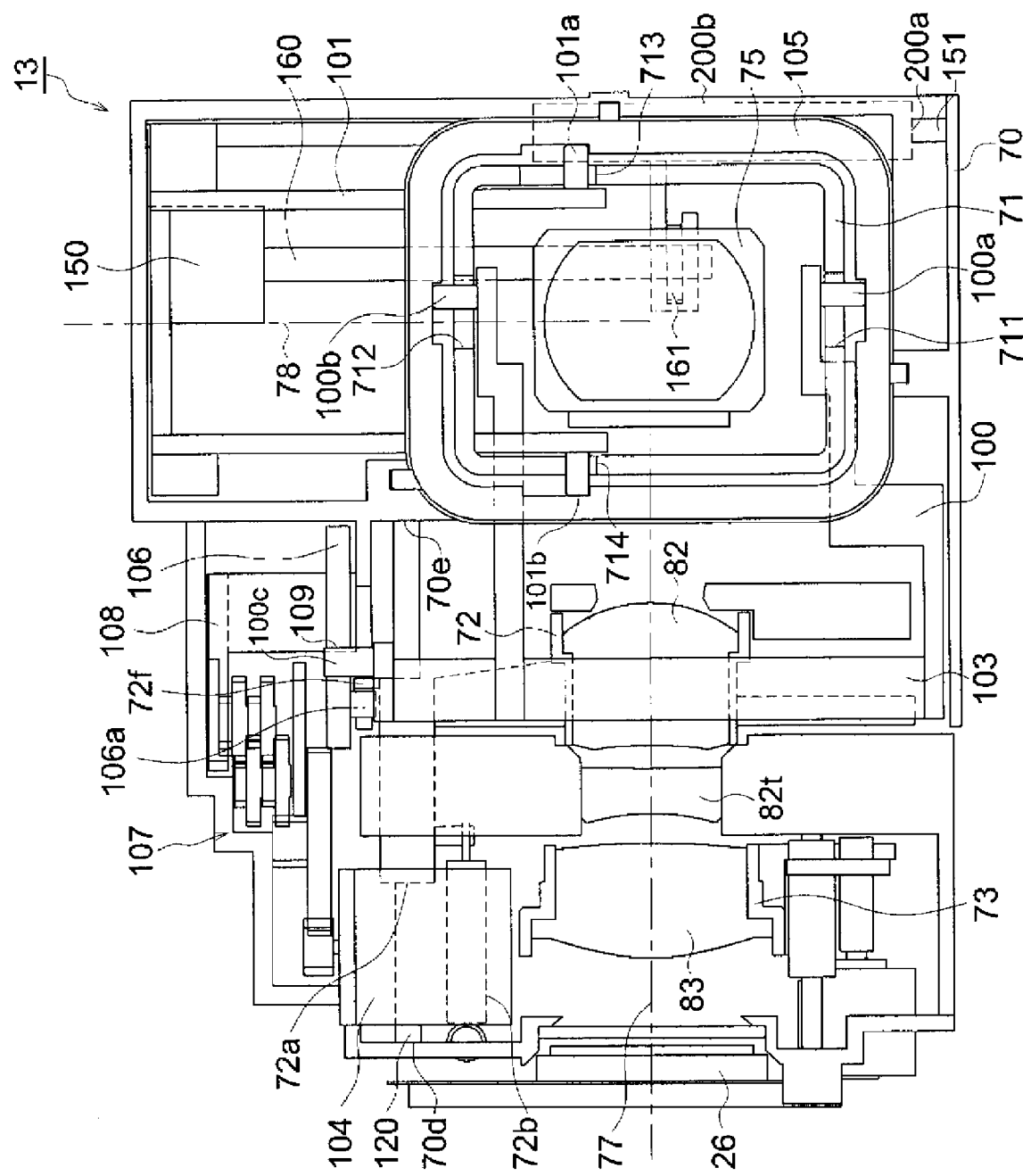
FIG. 9 is a front view of the lens unit of a third embodiment of the present invention.
Figure 10:
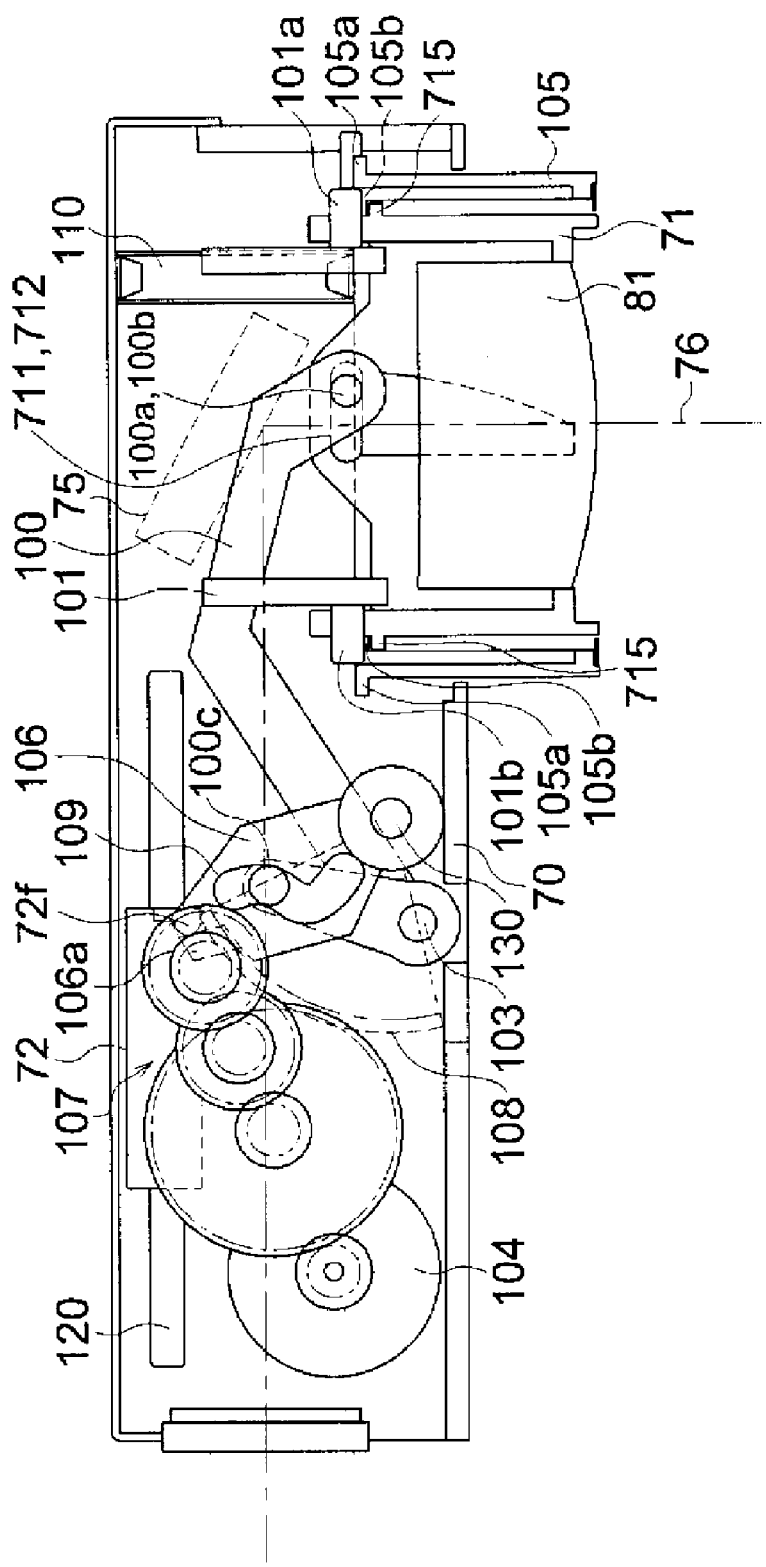
FIG. 10 is a side view of a wide angle state of the lens unit of a third embodiment of the present invention.
Figure 11:
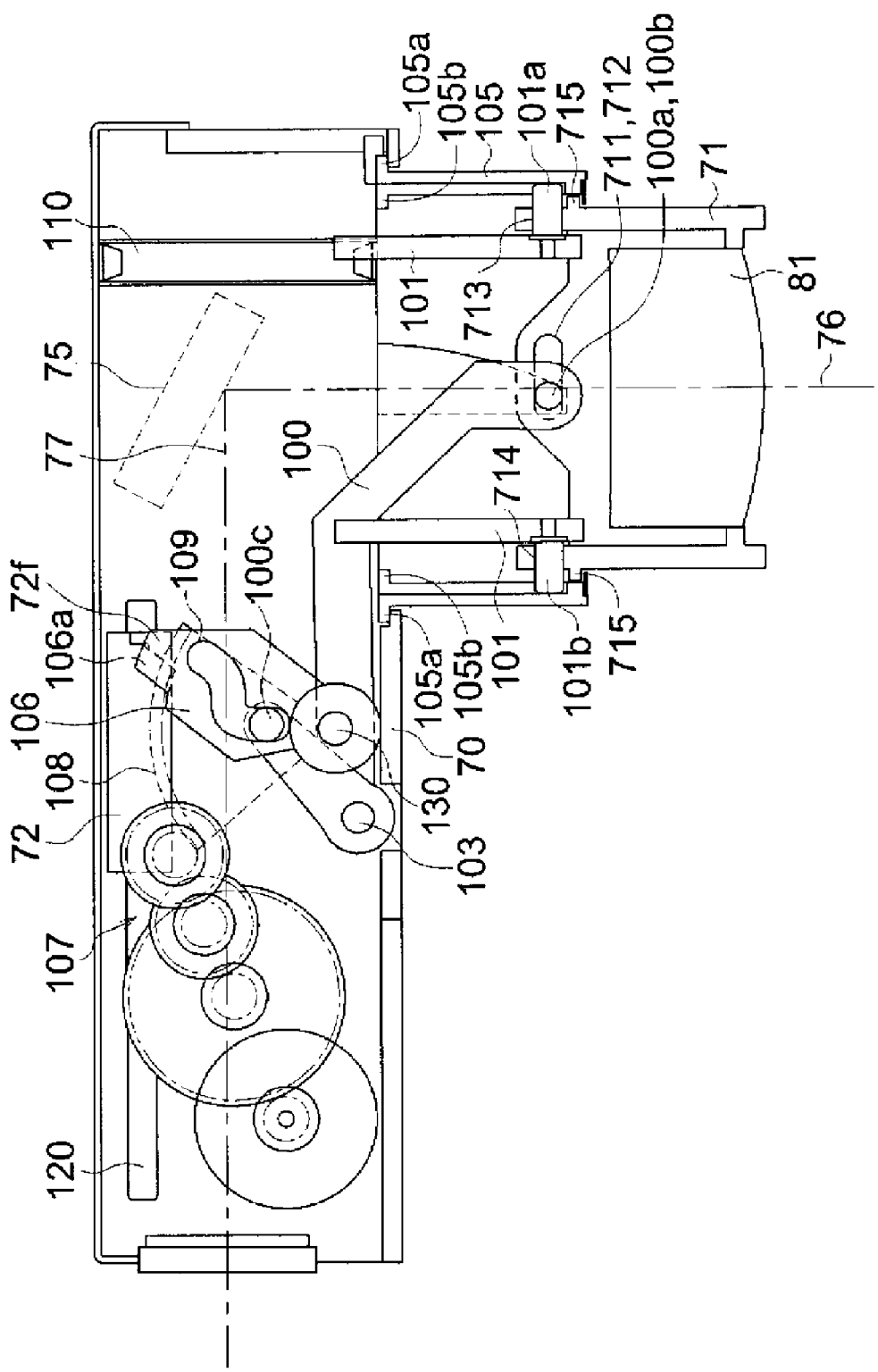
FIG. 11 is a side view of the telephoto state of the lens unit of the third embodiment of the present invention.
Figure 12:
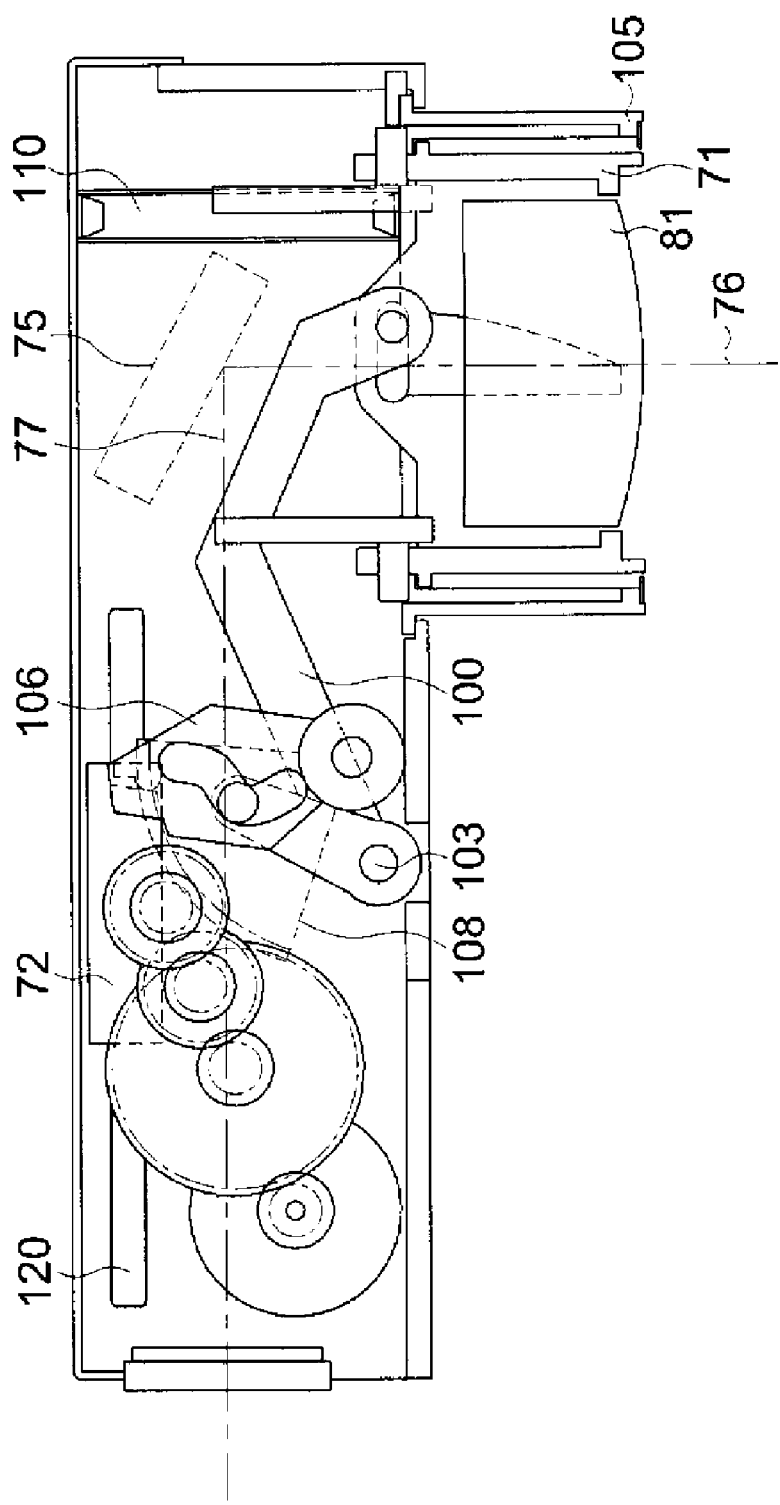
FIG. 12 is a side view of the position (prism insertion-and-detachment position) to which a first support member has been moved at the time of collapsing operation or start-up of the lens unit of the third embodiment of the present invention.
Figure 13:
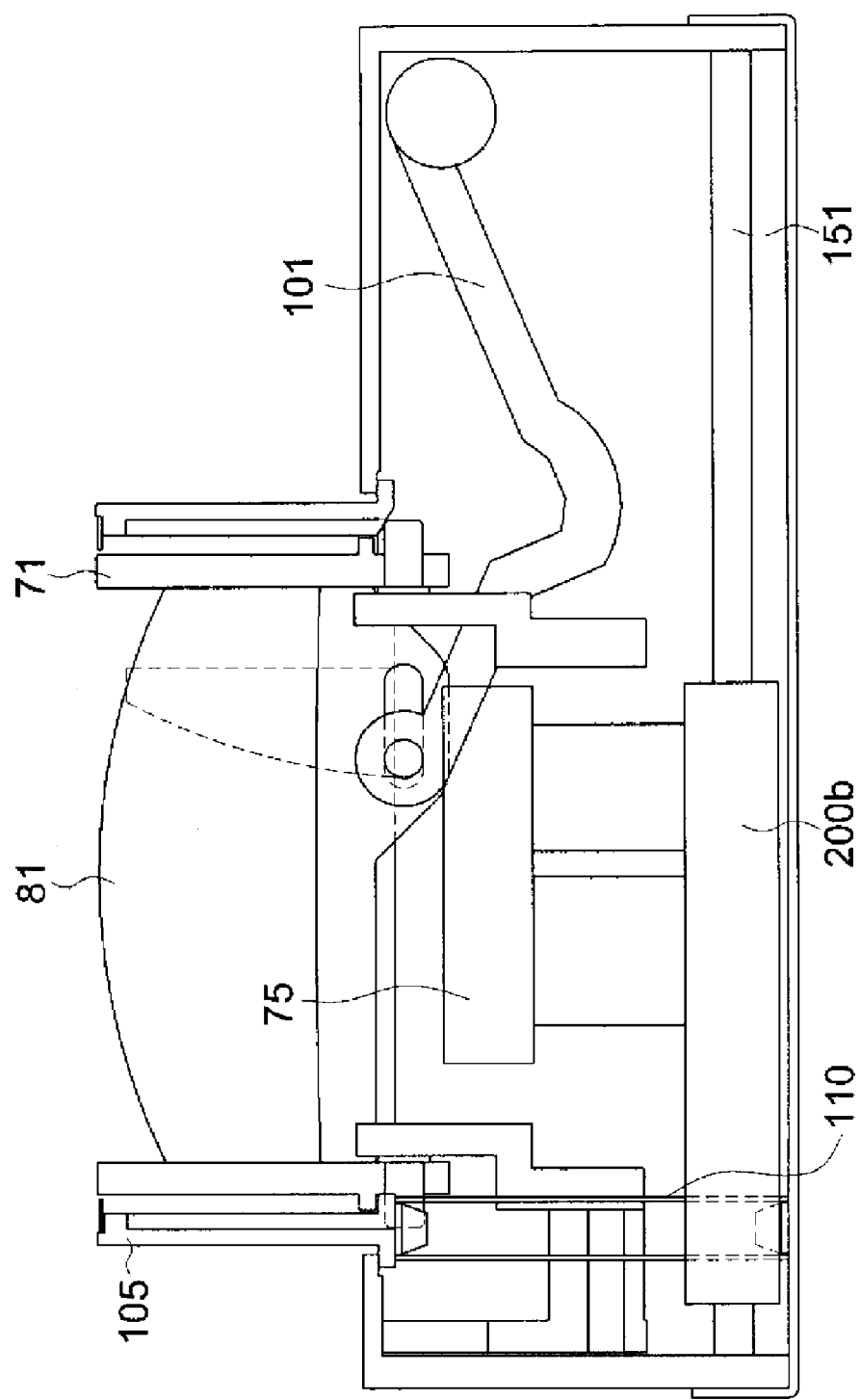
FIG. 13 is an upper surface view of the position (prism insertion-and-detachment position) to which the first support member has been moved at the time of the collapsing operation or start-up of the lens unit of the third embodiment of the present invention.
Figure 14:
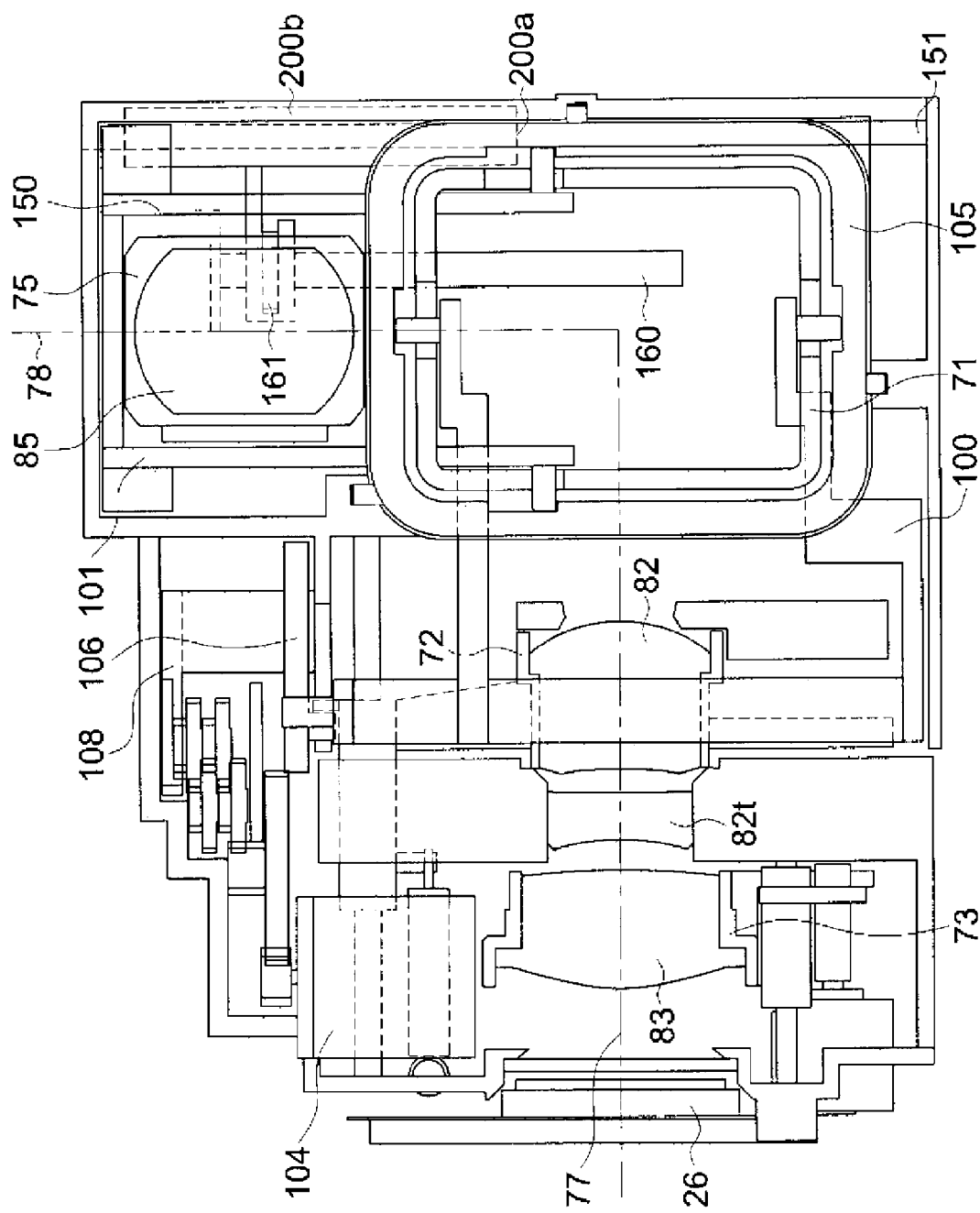
FIG. 14 is a front view at the time of the collapsing operation of the lens unit of the third embodiment of the present invention.
Figure 15:
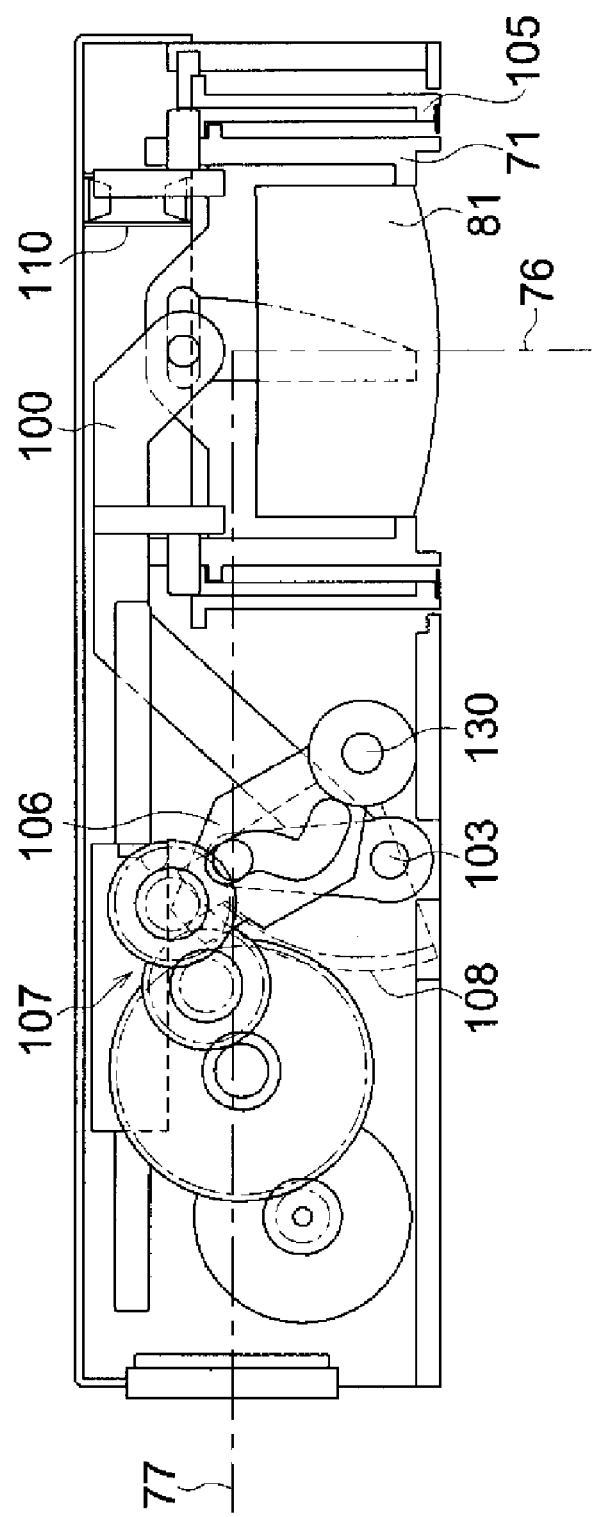
FIG. 15 is a side view at the time of the collapsing operation of the lens unit of the third embodiment of the present invention.
Figure 16:
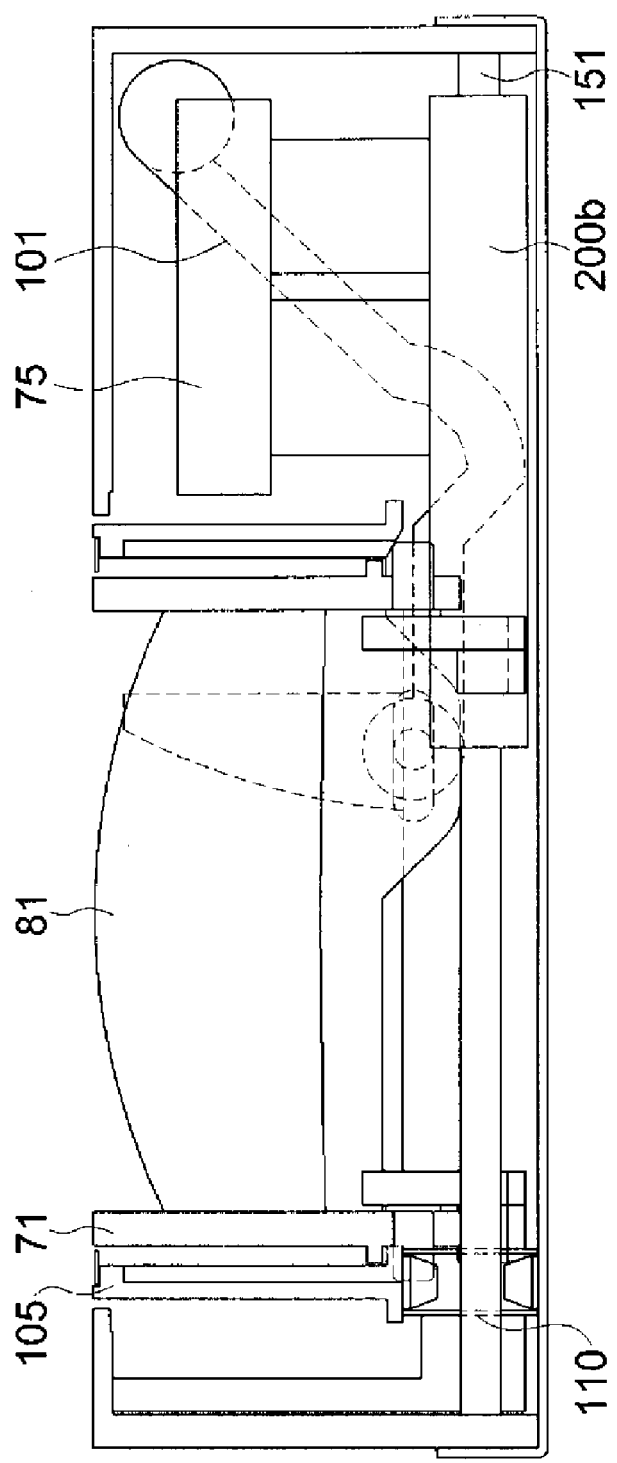
FIG. 16 is an upper surface view at the time of the collapsing operation of the lens unit of the third embodiment of the present invention.

FIG. 9 is a front view of the lens unit 13 in the wide angle state. FIG. 10 is a side view of the lens unit 13 in the wide angle state. FIG. 11 is a side view of the lens unit 13 in the telephoto state. FIG. 12 is a side view of the position (mirror insertion-and-detachment position) to which the first support member has been moved at the time of collapsing operation (when collapsing the lens) or start-up (when starting-up). FIG. 13 is an upper surface view of the position (mirror insertion-and-detachment position) to which the first support member has been moved at the time of the collapsing operation or start-up. FIGS. 14, 15 and 16 each are a front view, a side view and a top view in the collapsed state. With respect to the side view, the second and third lens groups are not illustrated, and they will be used for the explanations of the motions of the first zooming movement member and the first lens group.

The structure of lens unit 13 will be explained by using FIG. 9-FIG. 11 first. The same number is given to the member of the same function as the first lens unit, and the duplicated explanation will be omitted.

When zooming, the first lens group 81, the second lens group 82 and the third lens group 83 move, and when focusing, the third lens group 83 moves. The hand shake correcting lens group 82t is a fixed group.

The structure for zooming movement will be explained. When zooming from the wide angle end to the telephoto end is performed, the first lens group 81 will move toward the photographic object, the second lens group 82 will move toward the mirror 85 and the third lens group 83 will move toward the image sensor 26.

The structure which performs the zooming movement of the first support member 71 supporting the first lens group 81 comprises the first support member 71 supporting the first lens group 81, a drive piece 100 having driving piece pins 100a and 100b which are engaging with guide grooves 711 and 712 of the first support member 71, and a following piece 101 for controlling, together with the drive piece 100, the posture of the first support member, wherein the following piece 101 is equipped with the following piece pins 101a and 101b wedge fitted to the guide grooves 713 and 714 of the first support member 71. The outside of the first support member 71 is equipped with a linearly-moving cylinder 105 energized by the spring 110 toward the photographic object.

The first support member 71 is configured of a square-shaped cylindrical frame, and an angled U-shaped arm of the drive piece 100 and the following piece 101 are assembled so that they slide on the inside surface of the first support member 71. This arrangement controls the posture of the first support member so that it moves along the optical axis 76 but does not rotate about the optical axis 76. The first support member 71 is configured so that the drive piece 100 rotates about the driven piece shaft 103. Thereby, this rotation force is transmitted to the first support member 71 by the driving piece pins 100a and 100b, and this rotation force is converted into the force causing a straight movement in parallel with the optical axis 76. The rotation force of the drive piece 100 is the force that is generated by the first motor 104, which is an actuator, and transmitted via a transmission gear array 107 and a cam plate 106, which constitutes a cam mechanism. The rotation force transmitted to the drive piece 100 is converted into the force for moving the first support member in the optical-axis 76 direction.

Since the spring energization of the contact section 105b of the linearly-moving cylinder 105 is applied to the bottom section 715 of the first support member 71 by the linearly-moving cylinder compression spring 110, the linearly-moving cylinder 105 moves toward the photographic object together with the first support member 71, and stops when the bottom section 105a of the linearly-moving cylinder 105 has contacted the chassis 70. After the bottom section 105a of the linearly-moving cylinder 105 stops in contact with the chassis 70, the first support member 71 moves toward the photographic object and reaches the telephoto end. As mentioned above, the drive piece 100 configures a first zooming movement member which moves the first support member 71.

When the first motor 104 rotates, the rotation driving force slowed down by the reduction gear array 107 will rotate a sector gear section 108 of the cam plate 106. The rotation force from the sector gear section 108 is transmitted to the drive piece 100 via the driving piece pin 100C, which engaged with a cam plate groove 109. When the drive piece 100 rotates about the driven piece shaft 103, the rotation force linearly moves the first support member 71 in the optical-axis 76 direction via the guide grooves 711 and 712 of the first support member 71 which engaged with the driving piece pins 100a and 100b. As a result, the first support member 71 is extended outwardly toward the photographic object, and it reaches the telephoto end. When the first support member 71 moves straight, the moving force will be transmitted to the following piece pins 101a and 101b of the following piece 101 which engages with guide grooves 713 and 714, and the following piece 101 will move interlocking with the motion of the first support member. At this time, the first support member 71 is controlled not to rotate by the sliding motion between the internal surface of the first support member 71 and the external surface of the following piece 101.

Next, with respect to the structure of the zooming movement of the second support member 72, the first guide shaft 120 is arranged in parallel with the second optical axis 77, and its both ends are fixed to the wall surfaces 70d and 70e of the chassis 70. The first guide shaft 120 is fitted in the sliding guide hole 72a of the second support member 72 which is a guide section, and the first guide shaft 120 guides the second support member 72 so that it can move in the direction of the second optical axis 77 without inclining to the second optical axis 77. At this time, the rotation around the first guide shaft 120 is controlled by the unillustrated straight guide rail.

Furthermore, spring energization of the second support member 72 is applied in the second-optical-axis 77 direction and toward the image sensor 26 by the second spring 72b, and the guide pin 72f of the second support member 72 is in contact with a displacement contact section 106a of the cam plate 106. The second support member 72 performs zooming movement by the rotation of the cam plate 106 because the displacement contact section 106a always contacts the guide pin 72f. As described above, the cam plate 106 is a second zooming movement member, and it is interlocked with and moves the first zooming movement member and the second zooming movement member.

Further, with respect to the structure of the zooming movement of the third support member 73, it is the same as that of the first lens unit 12.

The Operations will be explained.

Firstly, the operation to the telephoto end of FIG. 11 from the wide angle end of FIG. 10 will be explained. Since the movement of the lens group is the same motion as the first lens unit 12, it will be omitted. The reduction gear array 107 in FIG. 10 is driven by the drive of the first motor, and the sector gear section 108, which is a part of the cam plate 106, rotates about the cam plate shaft 130. The cam plate groove 109 of the cam plate 106 rotates, with the rotation of the sector gear section 108, around the cam plate shaft 130, the driving piece pin 100C engaging with this cam plate groove 109 moves along the cam plate groove 109, and the drive piece 100 rotates about the driven piece shaft 103. The driving piece pins 100a and 100b transmit the driving force to the guide grooves 711 and 712 engaging with the driving piece pins 100a and 100b, and thus the first support member 71 moves toward the photographic object along with the optical axis 76. The rotation of the cam plate 106 causes the displacement contact section 106a to push the guide pin 72f of the second support member 72, and the second support member 72 moves along the first guide shaft 120. Further, the contact section 105b, being interlocked with the motion of the first support member 71, moves toward the photographic object with its contact section 105b being touched to a bottom section 715 of the first support member 71, and then stops when the bottom section 105a of the linearly-moving cylinder 105 contacts the chassis 70. Only first support member 71 moves toward the photographic object after this. Further, the movement of the first support member 71 causes the guide grooves 713 and 714 of the first support member 71 to move, and then the following piece pins 101a and 101b of the following piece 101e engaged with the guide grooves 713 and 714 move. As described above, the first support member can be smoothly moved along the optical axis 76 by having the outside surface of the following piece 101 and the inside surface of the first support member 71 slide on each other. As described above, it reaches the telephoto end illustrated in FIG. 11.

Next, a collapsing operation will be explained.

When collapsing, as illustrated in FIGS. 12 and 13, the first support member 71 moves to the mirror insertion-and-detachment position. Next, as illustrated in FIGS. 14-16, the mirror support member 75 evacuates onto an axis 78 perpendicular to the optical axes 76 and 77. Then, the first support member moves on the first-optical-axis 76 to the space formed by the movement of the mirror 85, and the first support member is stored. At this time, the first support member 71 and the second support member 72 move being interlocked with each other. Firstly, when the power button 20 of the digital camera 1 of FIGS. 1(a), 1(b) and 2 is pushed and it turns off, the detector (position sensor 28), which detects the position of the first support member 71, determines whether the first support member 71 is in the wide angle end side or the telephoto end side with respect to the mirror insertion-and-detachment position. Based on the position information, the control section 27 outputs directions to the image pickup lens actuator 25 (refer to FIG. 2). In this embodiment, the mirror insertion-and-detachment position is the position where the first support member 71 is located between the wide angle end and the telephoto end. When the first support member 71 is in the wide angle end side, the control section 27 will make the first motor 104 rotate in the direction (photographic object side) in which the first support member 71 moves to the mirror insertion-and-detachment position from the wide angle end side, and when the first support member 71 is in the telephoto end side, the control section 27 will make the first motor 104 rotate in the direction in which the first support member 71 moves to the mirror insertion-and-detachment position from the telephoto end side. As a detector of the position of the first support member 71, an encoder may be used for example, and the position of first support member 71 can be calculated from the drive direction and the number of pulses to have been used to drive the first motor setting the time of the turn-off of the power supply as a standard. Since the first support member 71 is set closest to the mirror at the wide angle end, the length of the projection of the first support member 71 from the camera at the time of variable magnification can be reduced. However, since the length of the projection of the first support member 71 is reduced, when moving the mirror to the evacuation position in the state of the wide angle end, the mirror support member 75 interferes with the drive piece 100 (first moving member), and it cannot be moved. Then, in order to form the space through which the mirror support member 75 can move to the evacuation position without interfering with the drive piece 100, the first support member 71 is once moved to the mirror insertion-and-detachment position. Then, while the first support member 71 is stopped, the mirror support member 75 is moved to the evacuation position. Then, the first support member 71 is collapsed into the collapsed position.

By doing this way, the zooming movement mechanism with the reduced projection length, of the lens in the photographic object side of the mirror, from the digital camera can be provided. And the structure of the zooming movement mechanism is simple, and it becomes possible to collapse, when not in use, the lens, which is in the photographic object side, into the digital camera without having interference with the mirror, and thus a small lens unit can be provided.

Next, the operation at the time of a collapsing operation will be concretely explained.

When the first motor 104 is driven, the drive piece 100 will rotate about the driven piece shaft 103, and the first support member 71 will move to the mirror insertion-and-detachment position, which is between the wide angle end (wide angle end) and the telephoto end (telephoto end) (refer to FIG. 12 and FIG. 13). When the first support member 71 is in the wide angle end illustrated in FIG. 10, the mirror support member 75 interferes with a part of the drive piece 100 when it moves to the evacuation position (the perpendicular direction to this paper sheet and the front side of this paper sheet), however, as illustrated in FIG. 12, the above-mentioned motion can create the space through which the mirror support member 75 can move to the evacuation position without interference with the drive pieces 100. Next, the mirror support member (bending member support member) 75 supporting the mirror 85 is evacuated to the evacuation position. While the mirror support member is moving to the evacuation position, the first support member is standing still at the mirror insertion-and-detachment position. The mechanism in which the mirror support member 75 is moved to the evacuation position will be explained using FIG. 14 and FIG. 15. The mirror support member 75 supporting the mirror 85 has a sliding guide section 200b and a sliding guide hole 200a, and the sliding guide hole 200a is fitted in by a second guide shaft 151 fixed on the chassis 70. The sliding guide section 200b is moved by a driving shaft 160 driven by the second motor 150, and the bending member moving member configured of an engaging screw 161. The sliding guide section 200b is connected with the engaging screw 161. When the second motor 150 rotates, the driving shaft 160 moves. Thereby the engaging screw 161 moves, and thereby the mirror support members 75 moves along the second guide shaft 151. Then, the mirror support member 75 evacuates to the evacuation position illustrated in FIG. 14 and FIG. 16.

Then, the first motor 104 is driven, then the drive piece 100 rotates, and the first support member 71 moves to the collapsed position (refer to FIG. 15 and FIG. 16), and that concludes the collapsing operation.

With respect to the startup, the first motor 104 moves in the reverse order to the order of the collapsing operation. That is, the first support member 71 moves to the mirror insertion-and-detachment position. At this time, the drive piece 100 for moving the first support member 71 is assumed the first moving member. Next, the mirror support member 75 moves to the bending position. Then, the first support member 71 moves to a desired variable magnification position by the zooming operation to perform image pickup.

As explained above, the lens unit comprises: the bending member 85 which bends the first optical axis 76 in the second-optical-axis 77 direction which is a substantially right angle; the first moving member for moving the first support member 71 which supports the first lens group 81 in the side of a photographic object from the bending member 85 to the storage position in the first-optical-axis 76 direction; the bending member moving member which moves the bending member 85 to the evacuation position where the space for storing the first support member 71 is provided; and the first zooming movement member which moves the first support member 71 in the first-optical-axis 76 direction so as to realize variable magnification, wherein the zooming of the first lens group 81 in the side of the photographic object can be performed in the configuration in which at the time of collapsing, after providing the space through which the bending member supporting member can move, the bending member moving member moves the bending member supporting member therethrough, and then the first moving member moves the first support member. Further, the above arrangement realizes a zoom lens of a large zoom ratio and enables the lens unit to be small, when not in use, by storing the first lens group 81 in the side of a photographic object in the lens unit 12.

Further, the lens unit comprises: the bending member 85 which bends the first optical axis 76 in the second-optical-axis 77 direction which is a substantially right angle; the first moving member for moving the first support member 71 which supports the first lens group 81 in the side of a photographic object from the bending member 85 to the storage position in the first-optical-axis 76 direction; the bending member moving member which moves the bending member 85 to the evacuation position where the space for storing the first support member 71 is provided; and the first zooming movement member which moves the first support member 71 in the first-optical-axis 76 direction so as to realize variable magnification, wherein the zooming of the first lens group 81 in the side of the photographic object can be performed in the configuration in which at the time of collapsing, the first supporting member is halted for a predetermined time period, the bending member moving member moves the bending member supporting member therethrough, and then the first moving member moves the first support member. Further, the above arrangement realizes a zoom lens of a large zoom ratio and enables the lens unit to be small, when not in use, by storing the first lens group 81 in the side of a photographic object in the lens unit 12.

Further, a first support member is located at the position (which is between a wide angle end and a telephoto end for a first support member) where image pickup is possible and the first support member is projected from the chassis while the bending member moving member is moving the bending member supporting member for collapsing the lens. This arrangement can realize a zoom lens of a large zoom ratio and enable the lens unit to be small with the first lens group 81 in the side of the photographic object being stored in the lens unit 13 when not in use. In addition, the first moving member is provided with the fixed cylinder attached to the chassis and the rotary cylinder rotatably attached to the fixed cylinder, wherein the notch section formed in the fixed cylinder and the notch section formed in the rotary cylinder overlap each other to create the space which enables the bending member supporting member to move to the evacuation position. This arrangement can realize a zoom lens of a large zoom ratio and enable the lens unit to be small with the first lens group 81 in the side of the photographic object being stored in the lens unit 13 when not in use.

A configuration is adopted in which the first zooming movement member is configured of the linearly-moving cylinder which moves straight together with the rotary cylinder and the zooming movable cylinder which is attached, movable in the first optical axis direction, to the linearly-moving cylinder, wherein when the rotary cylinder rotates: in a first rotation region, the zooming movable cylinder moves the first support member while zooming; in a second rotation region, the rotary cylinder moves the first support member to the storage position from the usage position; and in a third rotation region between the first and second rotation regions, the bending member moving member moves the bending member supporting member to the evacuation position. This arrangement enables the depth of the lens unit 12 to be small at the time of storage even though the zooming displacement of the first lens group 81 is large, and the arrangement realizes a mechanism of a simple structure for moving the first lens group 81 for collapsing.

In the lens unit in which the first support member is configured of the frame which can move in the first optical axis direction without rotating; the first zooming movement member has a angled U-shaped arm which is configured to linearly move the first support member in the optical axis direction; and the detector for detecting the position of the first support member, wherein the space through which the bending member supporting member can move to the evacuation position is created by moving the first support member and the first zooming movement member to a predetermined position after deciding the moving direction based on the detection result by the detector. This arrangement enables the depth of the lens unit 12 to be small at the time of storage even though the zooming displacement of the first lens group 81 is large, and the arrangement realizes a mechanism of a simple structure for moving the first lens group 81 for collapsing.

The invention claimed is:

1. A lens unit for focusing light from an object on an image sensor, the lens unit comprising:
    a first lens group which is provided in a direction of a first optical axis, receives the light from the object, and moves in the direction of the first optical axis in conjunction with a zooming operation;
    a first support member which supports the first lens group to be movable in the direction of the first optical axis;
    a first zooming movement member which moves the first support member in the direction of the first optical axis in conjunction with the zooming operation;
    a first moving member which moves the first support member to a usage position in which the first support member is projected from a chassis, and to a storage position in which the support member is stored in the chassis, wherein the first moving member includes:
        a fixed cylinder which is fixed on the chassis; and
        a rotary cylinder which is rotatably mounted on the fixed cylinder,
    a bending member which bends the first optical axis in a direction of a second optical axis which is substantially perpendicular to the direction of the first optical axis;
    a bending member supporting member which supports the bending member to be movable between a bending position in which the bending member bends the first optical axis in the direction of the second optical axis and an evacuation position in which a storage space for storing the support member is provided; and
    a bending member moving member which moves the bending member supporting member to the bending position and the evacuation position,
    wherein when collapsing, after a space is created, which space is defined by an overlapping portion of a notch portion formed in the fixed cylinder and a notch portion formed in the rotary cylinder, and through which space the bending member supporting member can be moved, the bending member moving member moves the bending member supporting member through the space, and then the first moving member moves the first support member.

2. A lens unit for focusing light from an object on an image sensor, the lens unit comprising:
    a first lens group which is provided in a direction of a first optical axis, receives the light from the object, and moves in the direction of the first optical axis in conjunction with a zooming operation;

a first support member which supports the first lens group to be movable in the direction of the first optical axis;

a first zooming movement member which moves the first support member in the direction of the first optical axis in conjunction with the zooming operation;

a first moving member which moves the first support member to a usage position in which the first support member is projected from a chassis, and to a storage position in which the support member is stored in the chassis, wherein the first moving member includes:
  a fixed cylinder which is fixed on the chassis; and
  a rotary cylinder which is rotatably mounted on the fixed cylinder, a bending member which bends the first optical axis in a direction of a second optical axis which is substantially perpendicular to the direction of the first optical axis;

a bending member supporting member which supports the bending member to be movable between a bending position in which the bending member bends the first optical axis in the direction of the second optical axis and an evacuation position in which a storage space for storing the support member is provided; and a bending member moving member which moves the bending member supporting member to the bending position and the evacuation position,
  wherein when collapsing, the first support member is halted for a predetermined period of time while a space is maintained, which space is defined by an overlapping portion of a notch portion formed in the fixed cylinder and a notch portion formed in the rotary cylinder, and through which space the bending member supporting member can be moved, the bending member moving member moves the bending member supporting member, and then the first moving member moves the first support member.

3. The lens unit of claim 2, wherein the first moving member includes:
  a fixed cylinder which is fixed on the chassis; and
  a rotary cylinder which is rotatably mounted on the fixed cylinder,
  wherein when the first support member is halted, the rotary cylinder is rotating.

4. The lens unit of claim 1, wherein the first zooming movement member is configured of:
  a linearly-moving cylinder which linearly moves together with the rotary cylinder; and
  a zooming movable cylinder which is mounted, movably in the direction of the first optical axis, on the linearly-moving cylinder,
  wherein when the rotary cylinder rotates, the zooming movable cylinder moves the first support member in conjunction with the zooming operation in a first rotation region, the rotary cylinder moves the first support member from the usage position to the storage position in a second rotation region, and the bending member moving member moves the bending member support member to the evacuation position in a third rotation region which is between the first rotation region and the second rotation region.

5. The lens unit of claim 4, wherein the bending member moving member includes:
  a rotary shaft which is parallel to the first optical axis,
  wherein in the third rotation region, the bending member moving member rotatingly moves the bending member supporting member about the rotary shaft from the bending position to the evacuation position.

6. The lens unit of claim 4, wherein the notch portion formed in the fixed cylinder and the notch portion formed in the rotary cylinder overlap each other in the third rotation region.

7. The lens unit of claim 4, wherein the first support member is halted for a predetermined period of time in the third rotation region.

8. The lens unit of claim 7, wherein the first zooming movement member includes:
  a cam portion having a cam groove which corresponds to the first rotation region through the third rotation region,
  wherein a portion, of the cam groove, corresponding to the third rotation region is perpendicular to the first optical axis.

9. The lens unit of claim 1, comprising:
  an actuator which moves the first moving member; and
  a mechanism which causes the bending member moving member to move the bending member supporting member in conjunction with a movement of the first moving member caused by the actuator.

10. A lens unit for focusing light from an object on an image sensor, the lens unit comprising:
  a first lens group which is provided in a direction of a first optical axis, receives the light from the object, and moves in the direction of the first optical axis in conjunction with a zooming operation;
  a first support member which supports the first lens group to be movable in the direction of the first optical axis;
  a first zooming movement member which moves the first support member in the direction of the first optical axis in conjunction with the zooming operation;
  a first moving member which moves the first support member to a usage position in which the first support member is projected from a chassis, and to a storage position in which the support member is stored in the chassis;
  a detection section which detects a position of the first support member;
  a bending member which bends the first optical axis in a direction of a second optical axis which is substantially perpendicular to the direction of the first optical axis;
  a bending member supporting member which supports the bending member to be movable between a bending position in which the bending member bends the first optical axis in the direction of the second optical axis and an evacuation position in which a storage space for storing the support member is provided; and
  a bending member moving member which moves the bending member supporting member to the bending position and the evacuation position,
  wherein the first support member is configured of a frame member which can move in the direction of the first optical axis without rotation, the first zooming movement member is configured to have an angled U-shaped arm which linearly moves the first support member in the direction of the optical axis, and when collapsing, a space through which the bending member supporting member can be moved is created by moving the first support member and the first zooming movement member to a predetermined position after deciding a moving direction of the first support member based on a detection result of the detection section, and then the bending member moving member moves the bending member supporting member through the space, and after that the first moving member moves the first support member.

11. A lens unit for focusing light from an object on an image sensor, the lens unit comprising:
- a first lens group which is provided in a direction of a first optical axis, receives the light from the object, and moves in the direction of the first optical axis in conjunction with a zooming operation;
- a first support member which supports the first lens group to be movable in the direction of the first optical axis;
- a first zooming movement member which moves the first support member in the direction of the first optical axis in conjunction with the zooming operation;
- a first moving member which moves the first support member to a usage position in which the first support member is projected from a chassis, and to a storage position in which the support member is stored in the chassis;
- a bending member which bends the first optical axis in a direction of a second optical axis which is substantially perpendicular to the direction of the first optical axis;
- a bending member supporting member which supports the bending member to be movable between a bending position in which the bending member bends the first optical axis in the direction of the second optical axis and an evacuation position in which a storage space for storing the support member is provided; and
- a bending member moving member which moves the bending member supporting member to the bending position and the evacuation position,
- wherein the first support member is configured of a frame member which can move in the direction of the first optical axis without rotation, the first zooming movement member is configured to have an angled U-shaped arm which linearly moves the first support member, and when collapsing, the first support member is halted for a predetermined period of time, the bending member moving member moves the bending member supporting member from the bending position to the evacuation position while the first support member is halted, and then the first moving member moves the first support member.

12. The lens unit of claim 1, comprising:
two driving sources,
wherein one of the driving sources drives the first zooming movement member, and the other of the driving sources drives the first moving member.

13. An image pickup apparatus, comprising:
a lens unit for focusing light from an object on an image sensor, the lens unit including:
- a first lens group which is provided in a direction of a first optical axis, receives the light from the object, and moves in the direction of the first optical axis in conjunction with a zooming operation;
- a first support member which supports the first lens group to be movable in the direction of the first optical axis;
- a first zooming movement member which moves the first support member in the direction of the first optical axis in conjunction with the zooming operation;
- a first moving member which moves the first support member to a usage position in which the first support member is projected from a chassis, and to a storage position in which the support member is stored in the chassis, wherein the first moving member includes:
  - a fixed cylinder which is fixed on the chassis; and
  - a rotary cylinder which is rotatably mounted on the fixed cylinder,
- a bending member which bends the first optical axis in a direction of a second optical axis which is substantially perpendicular to the direction of the first optical axis;
- a bending member supporting member which supports the bending member to be movable between a bending position in which the bending member bends the first optical axis in the direction of the second optical axis and an evacuation position in which a storage space for storing the support member is provided; and
- a bending member moving member which moves the bending member supporting member to the bending position and the evacuation position,
- the image sensor which receives light guided by the lens unit,
- wherein when collapsing, after a space is created, which space is defined by an overlapping portion of a notch portion formed in the fixed cylinder and a notch portion formed in the rotary cylinder, and through which space the bending member supporting member can be moved, the bending member moving member moves the bending member supporting member through the space, and then the first moving member moves the first support member.

14. The lens unit of claim 2, wherein the first zooming movement member is configured of:
- a linearly-moving cylinder which linearly moves together with the rotary cylinder; and
- a zooming movable cylinder which is mounted, movably in the direction of the first optical axis, on the linearly-moving cylinder,
- wherein when the rotary cylinder rotates, the zooming movable cylinder moves the first support member in conjunction with the zooming operation in a first rotation region, the rotary cylinder moves the first support member from the usage position to the storage position in a second rotation region, and the bending member moving member moves the bending member support member to the evacuation position in a third rotation region which is between the first rotation region and the second rotation region.

15. The lens unit of claim 14, wherein the bending member moving member includes:
a rotary shaft which is parallel to the first optical axis,
wherein in the third rotation region, the bending member moving member rotatingly moves the bending member supporting member about the rotary shaft from the bending position to the evacuation position.

16. The lens unit of claim 14, wherein the notch portion formed in the fixed cylinder and the notch portion formed in the rotary cylinder overlap each other in the third rotation region.

17. The lens unit of claim 14, wherein the first support member is halted for a predetermined period of time in the third rotation region.

18. The lens unit of claim 17, wherein the first zooming movement member includes:
a cam portion having a cam groove which corresponds to the first rotation region through the third rotation region,
wherein a portion, of the cam groove, corresponding to the third rotation region is perpendicular to the first optical axis.

19. The lens unit of claim 9, comprising:
an actuator which moves the first moving member; and
a mechanism which causes the bending member moving member to move the bending member supporting member in conjunction with a movement of the first moving member caused by the actuator.

20. The lens unit of claim 2, comprising:
two driving sources,
wherein one of the driving sources drives the first zooming movement member, and the other of the driving sources drives the first moving member.

* * * * *